US012444340B2

(12) United States Patent
Zhai

(10) Patent No.: US 12,444,340 B2
(45) Date of Patent: Oct. 14, 2025

(54) DISPLAY PANEL, DRIVING METHOD THEREOF, AND DISPLAY DEVICE

(71) Applicant: Tianma Advanced Display Technology Institute (Xiamen) Co., Ltd., Xiamen (CN)

(72) Inventor: Yingteng Zhai, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 18/602,092

(22) Filed: Mar. 12, 2024

(65) Prior Publication Data

US 2024/0212561 A1 Jun. 27, 2024

(30) Foreign Application Priority Data

Oct. 31, 2023 (CN) ......................... 202311439539.2

(51) Int. Cl.

*G09G 3/3233* (2016.01)
*G09G 3/20* (2006.01)
*G09G 3/32* (2016.01)

(52) U.S. Cl.

CPC ......... *G09G 3/2081* (2013.01); *G09G 3/2011* (2013.01); *G09G 3/2014* (2013.01); *G09G 3/32* (2013.01); *G09G 3/3233* (2013.01); *G09G 2300/0819* (2013.01); *G09G 2310/062* (2013.01); *G09G 2310/08* (2013.01); *G09G 2320/0633* (2013.01); *G09G 2320/064* (2013.01)

(58) Field of Classification Search

CPC .. G09G 3/2081; G09G 3/2011; G09G 3/2014; G09G 3/32; G09G 3/3233; G09G 2300/0819; G09G 2310/062; G09G 2310/08; G09G 2320/0633; G09G 2320/064; G09G 3/30

See application file for complete search history.

(56) References Cited

U.S. PATENT DOCUMENTS 11,551,605 B2 * 1/2023 Kim .......................... G09G 3/32
2020/0286432 A1 * 9/2020 Zhang .................. G09G 3/3258
2021/0201786 A1 * 7/2021 Ma ........................ G09G 3/3266
2021/0225275 A1 * 7/2021 Cho ...................... G09G 3/3233
2022/0101783 A1 * 3/2022 Han .......................... G09G 3/32
2022/0215797 A1 * 7/2022 Zhai ...................... G09G 3/3225

(Continued)

*Primary Examiner* — Jose R Soto Lopez

(74) *Attorney, Agent, or Firm* — KDW FIRM PLLC

(57) ABSTRACT

Provided are a display panel, a driving method thereof, and a display device. The display panel includes pixel circuits and light-emitting elements. A pixel circuit includes an amplitude modulation circuit and a pulse width modulation circuit. The amplitude modulation circuit includes an amplitude driving sub-module and an amplitude reset sub-module. The amplitude reset sub-module is configured to transmit a first reset signal to a control terminal of the amplitude driving sub-module. The pulse width modulation circuit includes a pulse width driving sub-module and a pulse width reset sub-module. The pulse width reset sub-module is configured to transmit a second reset signal to a control terminal of the pulse width driving sub-module. The voltage value of the first reset signal is Vref1. The voltage value of the second reset signal is Vref2. Vref1≠Vref2.

20 Claims, 16 Drawing Sheets

(56) References Cited

U.S. PATENT DOCUMENTS

| | | | | |
|---|---|---|---|---|
| 2022/0246088 | A1* | 8/2022 | Zhai | G09G 3/32 |
| 2023/0042603 | A1* | 2/2023 | Huangfu | G09G 3/3233 |
| 2023/0057215 | A1* | 2/2023 | Hashimoto | G09G 3/2011 |
| 2023/0107029 | A1* | 4/2023 | Wang | G09G 3/3266 345/206 |
| 2023/0154394 | A1* | 5/2023 | Kim | G09G 3/2014 345/691 |
| 2023/0368731 | A1* | 11/2023 | Toyoda | H10K 59/131 |
| 2024/0038128 | A1* | 2/2024 | Liu | G09G 3/2022 |
| 2024/0135872 | A1* | 4/2024 | Wang | H10K 59/131 |
| 2024/0169905 | A1* | 5/2024 | Cao | H10K 59/1213 |
| 2024/0257744 | A1* | 8/2024 | Jung | G09G 3/3291 |

* cited by examiner

Control the voltage value of the first reset signal to be Vref1 and control the voltage value of the second reset signal to be Vref2, where Vref1 ≠ Vref2 — 171

DISPLAY PANEL, DRIVING METHOD THEREOF, AND DISPLAY DEVICE

CROSS-REFERENCE TO RELATED APPLICATION(S)

This application claims priority to Chinese Patent Application No. 202311439539.2 filed Oct. 31, 2023, the disclosure of which is incorporated herein by reference in its entirety.

TECHNICAL FIELD

The present application relates to the field of display technology, for example, a display panel, a driving method thereof, and a display device.

BACKGROUND

With the development of display technology, display panels are increasingly widely used, and accordingly, users have increasing requirements for the display quality of display panels. To satisfy requirements for higher definition, the resolution of display panels is becoming increasingly higher.

To satisfy requirements for driving high-resolution display panels, such as micro light-emitting diode (micro LED) display panels or organic light-emitting diode (OLED) display panels, driver circuits combining pulse amplitude modulation (PAM) and pulse width modulation (PWM) are used to control the intensity and duration of driving currents, and thus to control the light emission state of light-emitting elements.

However, in the related art, driver circuits combining pulse amplitude modulation (PAM) and pulse width modulation (PWM) have the problem of unreasonable design.

SUMMARY

Embodiments of the present application provide a display panel, a driving method thereof, and a display device. The voltage value of a reset signal of an amplitude modulation circuit and the voltage value of a reset signal of a pulse width modulation circuit are set differentially so as to better exert functions of the amplitude modulation circuit and functions of the pulse width modulation circuit, thereby improving design rationality.

In a first aspect, embodiments of the present application provide a display panel. The display panel includes pixel circuits and light-emitting elements. A pixel circuit among the pixel circuits includes an amplitude modulation circuit and a pulse width modulation circuit. The amplitude modulation circuit includes an amplitude driving sub-module and an amplitude reset sub-module, where the amplitude reset sub-module is configured to transmit a first reset signal to a control terminal of the amplitude driving sub-module. The pulse width modulation circuit includes a pulse width driving sub-module and a pulse width reset sub-module, where the pulse width reset sub-module is configured to transmit a second reset signal to a control terminal of the pulse width driving sub-module. A voltage value of the first reset signal is Vref1, and a voltage value of the second reset signal is Vref2, where Vref1≠Vref2.

Based on the same inventive concept, in a second aspect, an embodiment of the present application provides a display device. The display device includes the display panel described in the first aspect.

Based on the same inventive concept, in a third aspect, an embodiment of the present application provides a driving method of a display panel. The display panel includes pixel circuits and light-emitting elements.

A pixel circuit among the pixel circuits includes an amplitude modulation circuit and a pulse width modulation circuit.

The amplitude modulation circuit includes an amplitude driving sub-module and an amplitude reset sub-module, where the amplitude reset sub-module is configured to transmit a first reset signal to a control terminal of the amplitude driving sub-module.

The pulse width modulation circuit includes a pulse width driving sub-module and a pulse width reset sub-module, where the pulse width reset sub-module is configured to transmit a second reset signal to a control terminal of the pulse width driving sub-module.

The driving method of a display panel includes the step described below.

A voltage value of the first reset signal is controlled to be Vref1, and a voltage value of the second reset signal is controlled to be Vref2, where Vref1≠Vref2.

According to the display panel, the driving method thereof, and the display device provided in embodiments of the present application, Vref1≠Vref2. That is, the amplitude driving sub-module and the pulse width driving sub-module are reset by different reset voltages, better meeting different requirements of the amplitude driving sub-module and the pulse width driving sub-module, thereby better exerting functions of the amplitude modulation circuit and functions of the pulse width modulation circuit, and thereby improving design rationality.

BRIEF DESCRIPTION OF DRAWINGS

Other features, objects and advantages of the present application will become more apparent after a detailed description of non-limiting embodiments with reference to the drawings below is read. The same or similar reference numerals denote the same or similar structures. The drawings are not drawn to the actual scale.

REFERENCE LIST

Figure 1:
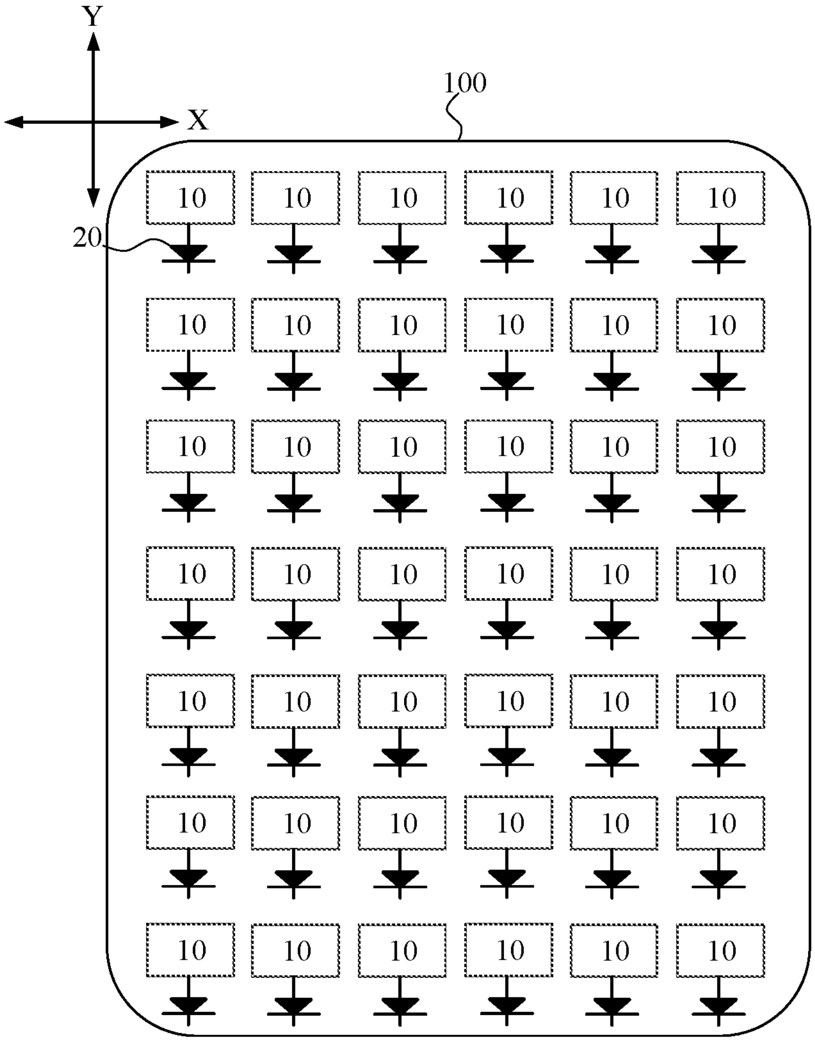
FIG. 1 is a structural diagram of a display panel according to an embodiment of the present application.

100 display panel
10*a* first pixel circuit
10*b* second pixel circuit
20 light-emitting element
20*a* first light-emitting element
20*b* second light-emitting element
11 amplitude modulation circuit
111 amplitude driving sub-module
112 amplitude reset sub-module
113 amplitude data write sub-module
114 anode reset sub-module
115 first compensation sub-module
116 first light emission control sub-module
12 pulse width modulation circuit
121 pulse width driving sub-module
122 pulse width reset sub-module
123 pulse width data write sub-module
125 second compensation sub-module
126 second light emission control sub-module
30 reset signal line
31 first reset signal line
32 second reset signal line
41 first data line
42 second data line
1000 display device

DETAILED DESCRIPTION

Features and example embodiments in various aspects of the present application are described hereinafter in detail. To provide clearer understanding of the objects, technical solutions and advantages of the present application, the present application is further described in detail in conjunction with drawings and embodiments. It is to be understood that the specific embodiments set forth below are configured to illustrate and not to limit the present application. To those skilled in the art, the present application may be implemented with no need for some of these specific details. The description of the embodiments hereinafter is intended only to provide better understanding of the present application through examples of the present application.

It is to be noted that herein, relationship terms such as first and second are used merely for distinguishing one entity or operation from another and do not necessarily require or imply any such actual relationship or order between these entities or operations. Furthermore, the term "comprising", "including" or any other variant thereof is intended to encompass a non-exclusive inclusion so that a process, method, article or device that includes a series of elements not only includes the expressly listed elements but also includes other elements that are not expressly listed or are inherent to such a process, method, article or device. In the absence of more restrictions, the elements defined by the statement "including . . . " do not exclude the presence of additional identical elements in the process, method, article or device that includes the elements.

It is to be understood that when the structure of a component is described and a layer or region is referred to as "on" or "above" another layer or region, it may refer to that the layer or region is directly located on another layer or region, or other layers or regions are included between the layer or region and another layer or region. If the component is turned over, the layer or region is located "below" or "underneath" another layer or region.

It is to be understood that the term "and/or" used herein merely describes the association relationships between associated objects and indicates that three relationships may exist. For example, A and/or B may indicate three cases: A exists alone, A and B both exist, and B exists alone. In addition, the character "/" herein generally indicates that the front and rear associated objects are in an "or" relationship.

The term "connected" may refer to "electrically connected" or "electrically connected without an intermediate transistor". The term "driving" may refer to "controlling" or "operating". The term "part of" may refer to "partial". The term "pattern" may refer to "component". The term "end" may refer to "end segment" or "end edge". The display panel may be a display device or a module/part of a display device.

It is apparent for those skilled in the art that various modifications and varies in the present application can be made without departing from the spirit or scope of the present application. Therefore, the present application is intended to cover modifications and varies of the present application which fall within the scope of the corresponding claims (the claimed technical solutions) and their equivalents. It is to be noted that implementations provided in the embodiments of the present application may be combined with each other if there is no contradiction.

Embodiments of the present application provide a display panel, a driving method thereof, and a display device. Various embodiments of the display panel, the driving method thereof, and the display apparatus are described hereinafter in conjunction with the drawings.

As shown in FIG. 1, the display panel includes pixel circuits 10 and light-emitting elements 20. A pixel circuit 10 is connected to a light-emitting element 20. The pixel circuit 10 is configured to drive the light-emitting element 20 to emit light. The light-emitting element 20 may be a light-emitting element such as a micro LED or an OLED and may be designed according to an actual situation. Optionally, the light-emitting element 20 may include a first electrode, a second electrode, and an inorganic light-emitting element of an inorganic semiconductor disposed between the first electrode and the second electrode.

The pixel circuits 10 and the light-emitting elements 20 may be disposed in an array in a first direction X and a second direction Y. The first direction X intersects the second direction Y. The first direction X may be the row direction. The second direction Y may be the column direction.

Figure 2:
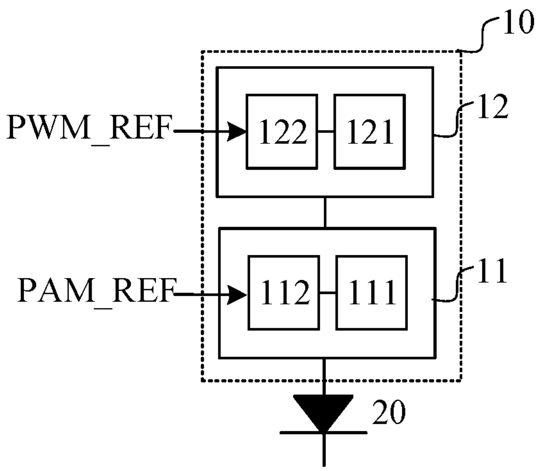
FIG. 2 is a structural diagram of a pixel circuit in a display panel according to an embodiment of the present application.

As shown in FIG. 2, the pixel circuit 10 includes an amplitude modulation circuit 11 and a pulse width modulation circuit 12. The amplitude modulation circuit 11 is connected to the pulse width modulation circuit 12. The pixel circuit 10 generates a driving current in the control of the amplitude modulation circuit 11 and the pulse width modulation circuit 12. The amplitude modulation circuit 11 may be configured to control the amplitude of the driving current. The pulse width modulation circuit 12 may be configured to adjust the pulse width of the voltage applied to the first electrode of the light-emitting element 20.

The pulse width modulation circuit 12 adjusts the pulse width of the voltage applied to the first electrode of the light-emitting element 20. That is, the pulse width modulation circuit 12 adjusts the actual emission period of the driving current applied to the light-emitting element 20 and maintains the driving current applied to the light-emitting element at a constant level so as to adjust the grayscale or brightness displayed by the light-emitting element instead of adjusting the grayscale or brightness displayed by the light-emitting element by adjusting the magnitude of the driving current applied to the light-emitting element. Therefore, the amplitude modulation circuit 11 can supply the driving current to the light-emitting element so that the light-emitting element is driven with the optimal luminescence efficiency. Moreover, the pulse width modulation circuit 12 adjusts the light emission duty cycle of the light-emitting element (that is, the emission period of the light-emitting element) so as to adjust the grayscale or brightness displayed by the light-emitting element.

The amplitude modulation circuit 11 includes an amplitude driving sub-module 111 and an amplitude reset sub-module 112. The amplitude reset sub-module 112 is connected to a control terminal of the amplitude driving sub-module 111 and is configured to transmit a first reset signal PAM_REF to the control terminal of the amplitude driving sub-module 111. The first reset signal PAM_REF may be configured to reset the potential of the control terminal of the amplitude driving sub-module 111.

The pulse width modulation circuit 12 includes a pulse width driving sub-module 121 and a pulse width reset sub-module 122. The pulse width reset sub-module 122 is connected to a control terminal of the pulse width driving sub-module 121 and is configured to transmit a second reset signal PWM_REF to a control terminal of the pulse width driving sub-module 121. The second reset signal PWM_REF may be configured to reset the potential of the control terminal of the pulse width driving sub-module 121.

The voltage value of the first reset signal PAM_REF is Vref1. The voltage value of the second reset signal PWM_REF is Vref2. Vref1≠Vref2.

If Vref1=Vref2, that is, if the same reset voltage is used for resetting the amplitude driving sub-module 111 and the pulse width driving sub-module 121, the same reset voltage might fail to meet different requirements of the amplitude driving sub-module 111 and the pulse width driving sub-module 121, thereby causing the problem of irrational design.

According to the display panel provided in embodiments of the present application, Vref1≠Vref2. That is, the amplitude driving sub-module 111 and the pulse width driving sub-module 121 are reset by different reset voltages, better meeting different requirements of the amplitude driving sub-module 111 and the pulse width driving sub-module 121, thereby better exerting functions of the amplitude modulation circuit 11 and functions of the pulse width modulation circuit 12, and thereby improving design rationality.

In some embodiments, Vref1<Vref2.

In other embodiments, Vref1>Vref2.

For example, the control terminal of the amplitude driving sub-module 111 receives a first data signal PAM_DATA. The control terminal of the pulse width driving sub-module 121 receives a second data signal PWM_DATA. The voltage value of the first data signal PAM_DATA is different from the voltage value of the second data signal PWM_DATA. If the voltage value of a reset signal is excessively high, it might fail to implement correct resetting or the compensation for the threshold voltage. If the voltage value of a reset signal is excessively low, the load of resetting and the load of subsequent operating processes might be added, or the compensation effect for the threshold voltage might be unsatisfactory. Therefore, in the case where the voltage value of the first data signal PAM_DATA is different from the voltage value of the second data signal PWM_DATA, the same reset voltage causes the problem of inappropriate design. In embodiments of the present application, Vref1<Vref2, or Vref1>Vref2. The magnitude of a reset voltage may be set flexibly according to different requirements, thereby alleviating the problem that the same reset voltage cannot meet different requirements of the amplitude driving sub-module 111 and the pulse width driving sub-module 121.

Figure 3:
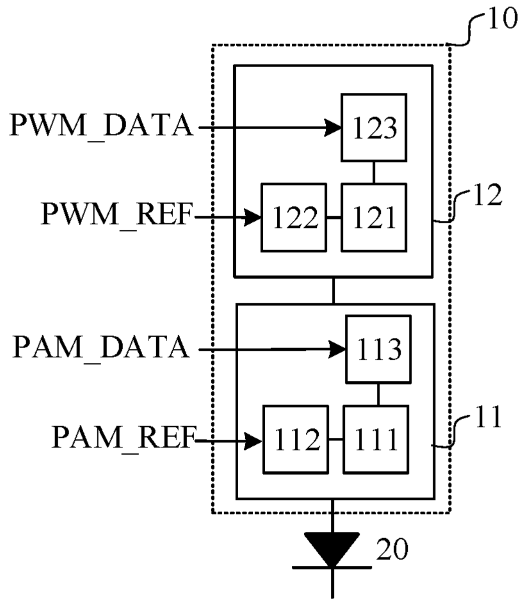
FIG. 3 is a structural diagram of another pixel circuit in a display panel according to an embodiment of the present application.

In some embodiments, as shown in FIG. 3, the amplitude modulation circuit 11 includes an amplitude data write sub-module 113 configured to transmit the first data signal PAM_DATA to the amplitude driving sub-module 111. Exemplarily, the amplitude data write sub-module 113 is connected to a first terminal of the amplitude driving sub-module 111. The first data signal PAM_DATA may be transmitted through the amplitude data write sub-module 113 to the first terminal of the amplitude driving sub-module 111 and then to the control terminal of the amplitude driving sub-module 111.

The pulse width modulation circuit 12 includes a pulse width data write sub-module 123 configured to transmit the second data signal PWM_DATA to the pulse width driving sub-module 121. Exemplarily, the pulse width data write sub-module 123 is connected to a first terminal of the pulse width driving sub-module 121. The second data signal PWM_DATA may be transmitted through the pulse width data write sub-module 123 to the first terminal of the pulse width driving sub-module 121 and then to the control terminal of the pulse width driving sub-module 121.

The amplitude modulation circuit 11 may control the amplitude of the driving current based on the voltage value of the first data signal PAM_DATA. The pulse width modulation circuit 12 may adjust the pulse width of the voltage applied to the first electrode of the light-emitting element 20 based on the voltage value of the second data signal PWM_DATA.

The voltage value of the first data signal PAM_DATA is Vdata1. The voltage value of the second data signal PWM_DATA is Vdata2. Vdata1≠Vdata2.

In embodiments of the present application, Vdata1≠Vdata2. In this case, the magnitude of the data signal received by the amplitude modulation circuit 11 and the magnitude of the data signal received by the pulse width modulation circuit 12 can be controlled flexibly and independently according to requirements.

In some embodiments, Vdata1<Vdata2.

In other embodiments, Vdata1>Vdata2.

As an example, in the case where Vdata1<Vdata2, Vref1<Vref2.

As another example, in the case where Vdata1>Vdata2, Vref1>Vref2.

In the case where the voltage value of a data signal is relatively small, the relatively small voltage value of a reset signal may be matched. In the case where the voltage value of a data signal is relatively great, the relatively great voltage value of a reset signal may be matched. In this case, the problem that the reset voltage of any one of the amplitude modulation circuit 11 or the pulse width modulation circuit 12 is unmatched can be alleviated.

In some embodiments, the amplitude modulation circuit 11 and the pulse width modulation circuit 12 may each include multiple transistors. A driving transistor of the amplitude driving sub-module 111 and a driving transistor of the pulse width driving sub-module 112 may be each a p-type transistor.

In other embodiments, the amplitude modulation circuit 11 and the pulse width modulation circuit 12 may include multiple transistors. The driving transistor of the amplitude driving sub-module 111 and the driving transistor of the pulse width driving sub-module 112 may be each an n-type transistor.

Exemplarily, other transistors of the amplitude modulation circuit 11 may be in the same type as or different types from the driving transistor of the amplitude modulation circuit 11, and other transistors of the pulse width modulation circuit 12 may be in the same type as or different types from the driving transistor of the pulse width modulation circuit 12, which is not limited in the present application.

It is to be noted that transistors of the pixel circuit 10 are each a p-type transistor in the drawings of the present application, which is not intended to limit the present application.

As an example, in the case where the driving transistor of the amplitude driving sub-module 111 and the driving transistor of the pulse width driving sub-module 112 are each a p-type transistor, Vdata1<Vdata2, and Vref1<Vref2. Vref1<Vdata1, and Vref2<Vdata2. Vref1<0, and Vref2<0.

As another example, in the case where the driving transistor of the amplitude driving sub-module 111 and the driving transistor of the pulse width driving sub-module 112 are each an n-type transistor, Vdata1>Vdata2, and Vref1>Vref2. Vref1>0, and Vref2>0.

Figure 4:
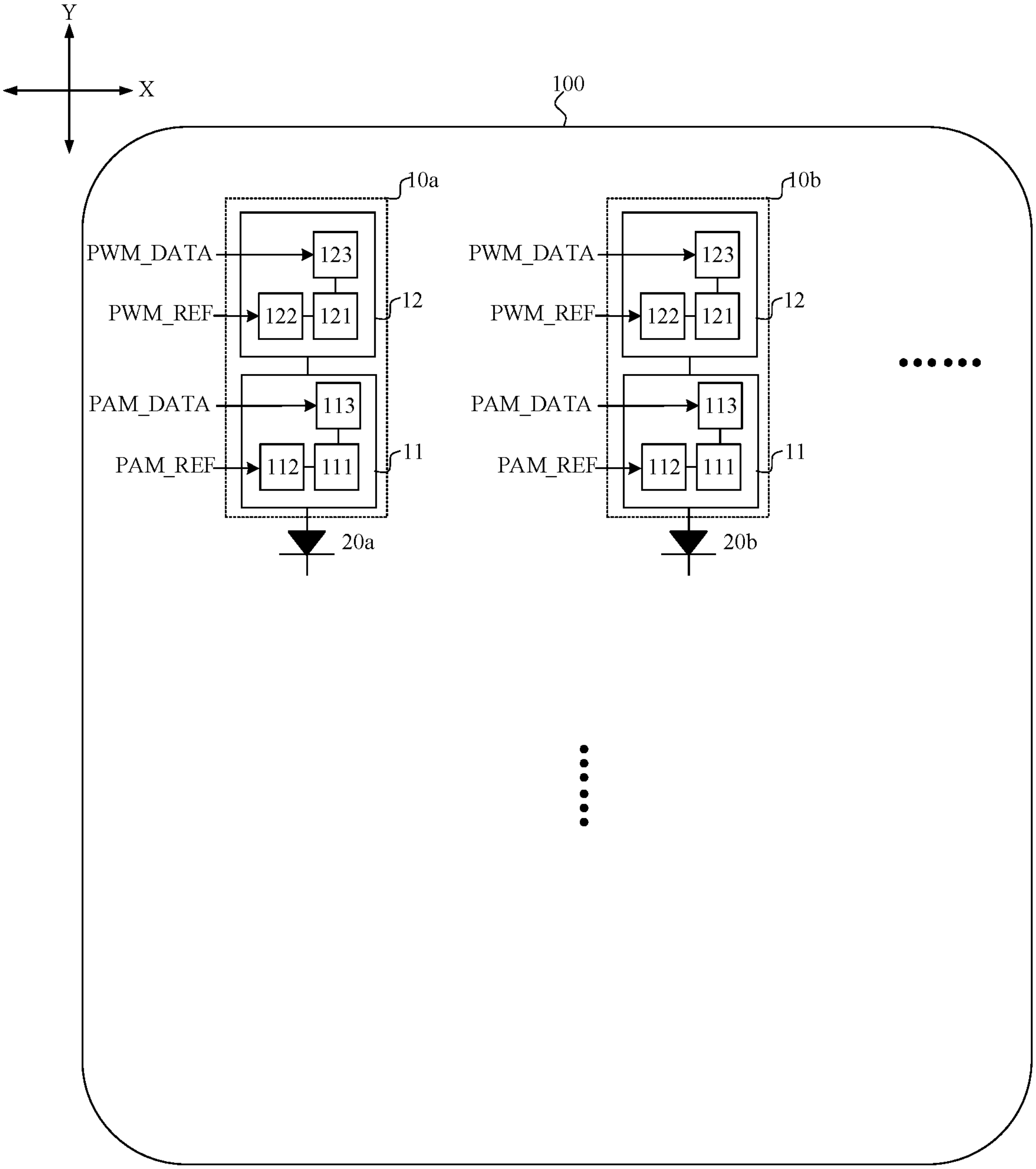
FIG. 4 is a structural diagram of another display panel according to an embodiment of the present application.

In some embodiments, as shown in FIG. 4, the pixel circuits 10 may include a first pixel circuit 10*a* and a second pixel circuit 10*b*. The light-emitting elements 20 include a first light-emitting element 20*a* and a second light-emitting element 20*b*. The first pixel circuit 10*a* is configured to drive the first light-emitting element 20*a*. The second pixel circuit 10*b* is configured to drive the second light-emitting element 20*b*. The emitted color of the first light-emitting element 20*a* is different from the emitted color of the second light-emitting element 20*b*.

The voltage value of the first reset signal transmitted by an amplitude reset sub-module 112 in the first pixel circuit 10*a* is Vref11. The voltage value of the second reset signal transmitted by a pulse width driving sub-module 122 in the first pixel circuit 10*a* is Vref21. The voltage value of the first reset signal transmitted by an amplitude reset sub-module 112 in the second pixel circuit 10*b* is Vref12. The voltage value of the second reset signal transmitted by a pulse width driving sub-module 122 in the second pixel circuit 10*b* is Vref22.

Vref11≠Vref12, and/or Vref21≠Vref22.

Light-emitting elements of different colors have different features and may have different driving requirements so that driver circuits of light-emitting elements of different colors have different resetting requirements. In embodiments of the present application, Vref11≠Vref12, and/or Vref21≠Vref22. The magnitude of a reset voltage corresponding to a light-emitting element may be set flexibly according to different requirements of light-emitting elements of different colors, thereby further improving design rationality.

In some embodiments, Vref11=Vref12, and Vref21=Vref22.

In some embodiments, Vref11=Vref12, and Vref21≠Vref22.

In some embodiments, Vref11≠Vref12, and Vref21=Vref22.

In some embodiments, (Vref11−Vref12)≠(Vref21−Vref22).

Exemplarily, the voltage value of a reset signal transmitted by an amplitude reset sub-module 112 in a pixel circuit for driving a green light-emitting element may be equal to the voltage value of a reset signal transmitted by an amplitude reset sub-module 112 in a pixel circuit for driving a blue light-emitting element.

The voltage value of a reset signal transmitted by a pulse width reset sub-module 122 in a pixel circuit for driving a green light-emitting element may be equal to the voltage value of a reset signal transmitted by a pulse width reset sub-module 122 in a pixel circuit for driving a blue light-emitting element.

In some embodiments, with continued reference to FIG. 4, the amplitude modulation circuit 11 includes the amplitude data write sub-module 113 configured to transmit the first data signal PAM_DATA to the amplitude driving sub-module 111.

The pulse width modulation circuit 12 includes the pulse width data write sub-module 123 configured to transmit the second data signal PWM_DATA to the pulse width driving sub-module 121.

The voltage value of the first data signal written by an amplitude data write sub-module 113 in the first pixel circuit 10*a* is Vdata11. The voltage value of the second data signal written by a pulse width data write sub-module 123 in the first pixel circuit 10*a* is Vdata21.

The voltage value of the first data signal written by an amplitude data write sub-module 113 in the second pixel circuit 10*b* is Vdata12. The voltage value of the second data signal written by a pulse width data write sub-module 123 in the second pixel circuit 10*b* is Vdata22.

Vdata11≠Vdata12, and/or Vdata21≠Vdata22.

Light-emitting elements with different emitted colors have different features and may have different driving requirements so that driving circuits of light-emitting elements with different emitted colors have different data voltage requirements. In embodiments of the present application, Vdata11≠Vdata12, and/or Vdata21≠Vdata22. The magnitude of a data voltage corresponding to a light-emitting element may be set flexibly according to different requirements of light-emitting elements with different emitted colors, thereby further improving design rationality.

Exemplarily, the voltage value of a data signal transmitted by an amplitude data write sub-module 113 in a pixel circuit for driving a green light-emitting element may be equal to the voltage value of a data signal transmitted by an amplitude data write sub-module 113 in a pixel circuit for driving a blue light-emitting element.

The voltage value of a data signal transmitted by a pulse width data write sub-module 123 in a pixel circuit for driving a green light-emitting element may be equal to the voltage value of a data signal transmitted by a pulse width data write sub-module 113 in a pixel circuit for driving a blue light-emitting element.

As an example, the first light-emitting element 20*a* may include a red light-emitting element, and the second light-emitting element 20*b* may include at least one of a green light-emitting element or a blue light-emitting element. Vdata11<Vdata12, and Vref11<Vref12. Moreover/alternatively, Vdata21>Vdata22, and Vref21>Vref22.

That is, in the case where the voltage value of a data signal transmitted by an amplitude data write sub-module corresponding to a red light-emitting element is relatively small, correspondingly, an amplitude reset sub-module corresponding to the red light-emitting element may transmit a reset signal with a relatively small voltage value. In the case where the voltage value of a data signal transmitted by an amplitude data write sub-module corresponding to a green light-emitting element or a blue light-emitting element is relatively great, correspondingly, an amplitude reset sub-module corresponding to the green light-emitting element or the blue light-emitting element may transmit a reset signal with a relatively great voltage value.

Alternatively, in the case where the voltage value of a data signal transmitted by a pulse width data write sub-module corresponding to a red light-emitting element is relatively great, correspondingly, a pulse width reset sub-module corresponding to the red light-emitting element may transmit a reset signal with a relatively great voltage value. In the case where the voltage value of a data signal transmitted by a pulse width data write sub-module corresponding to a green light-emitting element or a blue light-emitting element is relatively small, correspondingly, a pulse width reset sub-module corresponding to the green light-emitting element or the blue light-emitting element may transmit a reset signal with a relatively small voltage value.

As another example, the first light-emitting element 20*a* may include a red light-emitting element, and the second light-emitting element 20*b* may include at least one of a green light-emitting element or a blue light-emitting element. Vdata11>Vdata12, and Vref11>Vref12. Moreover/alternatively, Vdata21<Vdata22, and Vref21<Vref22.

In the preceding embodiments, in the case where magnitudes of date voltages of light-emitting elements with different colors change, magnitudes of reset voltages may be adjusted correspondingly.

In some embodiments, the first light-emitting element includes a red light-emitting element, and the second light-emitting element includes at least one of a green light-emitting element or a blue light-emitting element. Driving transistors in a pixel circuit include p-type transistors. Vdata11<Vdata12, and Vref11<Vref12. Moreover/alternatively, Vdata21>Vdata22, and Vref21>Vref22.

Alternatively, driving transistors in a pixel circuit include n-type transistors. Vdata11>Vdata12, and Vref11>Vref12. Moreover/alternatively, Vdata21<Vdata22, and Vref21<Vref22.

In the preceding example, the case where driving transistors in a pixel circuit include p-type transistors refers to that a driving transistor in an amplitude driving sub-module 111 in a respective pixel circuit corresponding to each light-emitting element and a driving transistor in a pulse width driving sub-module 112 in a respective pixel circuit corresponding to each light-emitting element are each a p-type transistor. The case where driving transistors in a pixel circuit include n-type transistors refers to that a driving transistor in an amplitude driving sub-module 111 in a respective pixel circuit corresponding to each light-emitting element and a driving transistor in a pulse width driving sub-module 112 in a respective pixel circuit corresponding to each light-emitting element are each an n-type transistor.

In the preceding example, types of other transistors apart from driving transistors in a pixel circuit are not limited.

In some embodiments, data refresh rates of the display panel include a first data refresh rate and a second data refresh rate. The first data refresh rate is not equal to the second data refresh rate. For example, the first data refresh rate is 120 HZ, and the second data refresh rate is 60 HZ. In another example, the first data refresh rate is 30 HZ, and the second data refresh rate is 90 HZ.

It is to be noted that a data refresh rate refers to the frequency at which a data signal is effectively written into a control terminal of a driving sub-module. When the data refresh rate is greater, it indicates that the potential of the control terminal of the driving sub-module has a greater variation frequency. On the contrary, when the data refresh rate is smaller, it indicates that the potential of the control terminal of the driving sub-module has a smaller variation frequency.

The data refresh rate of the amplitude modulation circuit 11 may be the same as the data refresh rate of the pulse width modulation circuit 12

Exemplarily, under the first data refresh rate, the voltage value of the first reset signal is Vref13, and the voltage value of the second reset signal is Vref23. Under the second data refresh rate, the voltage value of the first reset signal is Vref14, and the voltage value of the second reset signal is Vref24.

$$|Vref13-Vref23|\neq|Vref14-Vref24|.$$

In embodiments of the present application, the first reset signal and the second reset signal have different voltage difference values under different data refresh rates. Accordingly, the magnitude of a reset voltage can be adjusted flexibly according to different requirements of different data refresh rates, thereby matching different requirements in data refresh rates and further improving design rationality.

In some embodiments, in the case where the first data refresh rate is greater than the second data refresh rate, |Vref13−Vref23|>|Vref14−Vref24|.

In some other embodiments, in the case where the first data refresh rate is greater than the second data refresh rate, |Vref13−Vref23|<|Vref14−Vref24|.

It is to be understood that Vref13≠Vref23 and that Vref14≠Vref24.

Exemplarily, Vref13≠Vref14, and/or Vref23≠Vref24.

Exemplarily, Vref13>Vref14, and/or Vref23>Vref24.

Exemplarily, Vref13<Vref14, and/or Vref23<Vref24.

In some embodiments, operating modes of the display panel include a first mode and a second mode. The brightness of the display panel in the first mode is different from the brightness of the display panel in the second mode.

In the first mode, the voltage value of the first reset signal is Vref15, and the voltage value of the second reset signal is Vref25. In the second mode, the voltage value of the first reset signal is Vref16, and the voltage value of the second reset signal is Vref26.

$$|Vref15-Vref25|\neq|Vref16-Vref26|.$$

In embodiments of the present application, the first reset signal and the second reset signal have different voltage difference values under different modes. Accordingly, the magnitude of a reset voltage can be adjusted flexibly according to different requirements of different modes, thereby matching different requirements in modes and further improving design rationality.

In some embodiments, the brightness of the display panel in the first mode is less than the brightness of the display panel in the second mode.

It is to be understood that Vref15≠Vref25 and Vref16≠Vref26.

Exemplarily, Vref15≠Vref16, and/or Vref25≠Vref26.

Exemplarily, Vref15<Vref16, and/or Vref25<Vref26.

Figure 5:
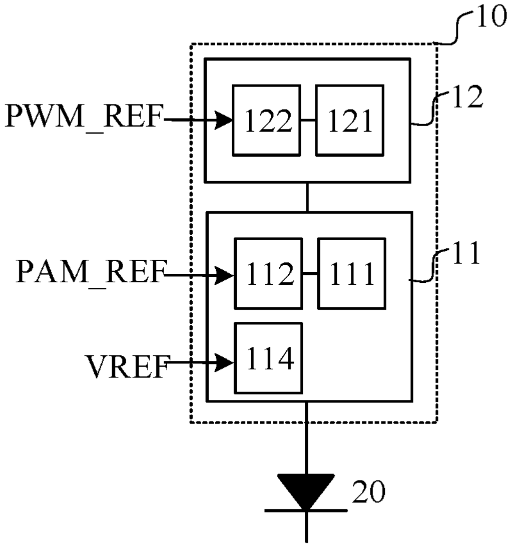
FIG. 5 is a structural diagram of another pixel circuit in a display panel according to an embodiment of the present application.

In some embodiments, as shown in FIG. 5, the amplitude modulation circuit 11 further includes an anode reset sub-module 114 connected to an anode of a light-emitting element 20. The anode reset sub-module 114 is configured to transmit a third reset signal VREF to the anode of the light-emitting element 20.

The voltage value of the third reset signal VREF is Vref3. Vref3≠Vref2.

The second reset signal PWM_REF is configured to reset the potential of the control terminal of the pulse width driving sub-module 121. The third reset signal VREF is configured to reset the anode of the light-emitting element 20. In embodiments of the present application, Vref3≠Vref2. In this case, the magnitude of the voltage of the second reset signal PWM_REF and the magnitude of the voltage of the third reset signal VREF can be adjusted flexibly and independently according to resetting requirements of the pulse width driving sub-module 121 and resetting requirements of the light-emitting element 20.

The first reset signal PAM_REF is configured to reset the potential of the control terminal of the amplitude driving sub-module 111. Exemplarily, Vref3≠Vref1. In this case, the magnitude of the voltage of the first reset signal PAM_REF and the magnitude of the voltage of the third reset signal VREF can be adjusted flexibly and independently according to resetting requirements of the amplitude driving sub-module 111 and resetting requirements of the light-emitting element 20.

In some embodiments, Vref3<Vref2.

Figure 6:
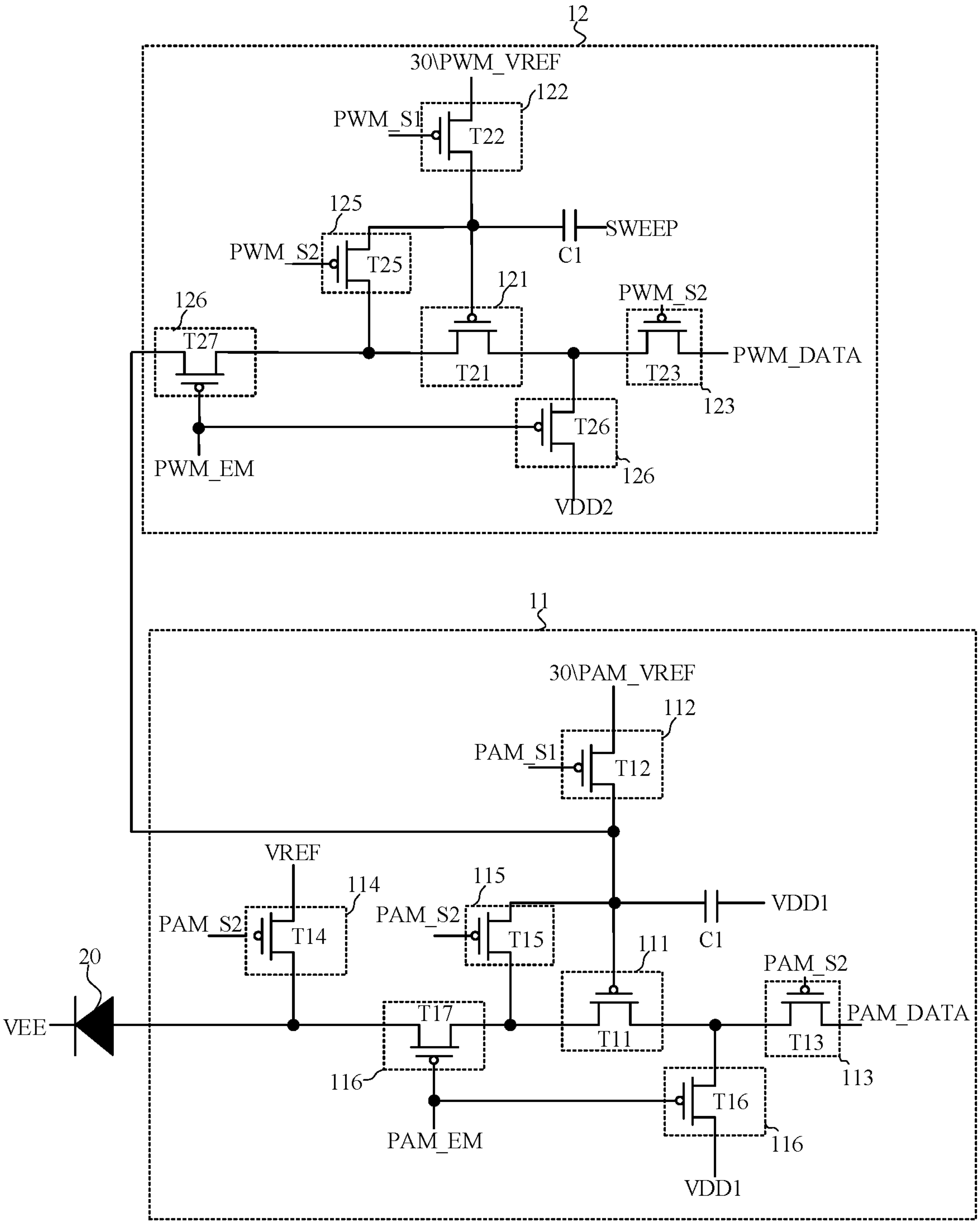
FIG. 6 is a structural diagram of another pixel circuit in a display panel according to an embodiment of the present application.

In some embodiments, as shown in FIG. 6, the amplitude reset sub-module 112 and the pulse width reset sub-module 122 are electrically connected to the same reset signal line 30. The reset signal line 30 is configured to transmit the first reset signal PAM_REF and the second reset signal PWM_REF in a time-sharing manner.

For example, when the amplitude reset sub-module 112 is controlled to be turned on, the first reset signal PAM_REF may be controlled to be transmitted on the reset signal line 30. When the pulse width reset sub-module 122 is controlled to be turned on, the second reset signal PWM_REF may be controlled to be transmitted on the reset signal line 30.

It is to be understood that the amplitude reset sub-module 112 and the pulse width reset sub-module 122 are turned on in a time-sharing manner in the case where the first reset signal PAM_REF and the second reset signal PWM_REF are transmitted on the reset signal line 30 in a time-sharing manner.

In embodiments of the present application, the same reset signal line 30 is configured to transmit the first reset signal PAM_REF and the second reset signal PWM_REF in a time-sharing manner, reducing the number of reset signal lines and thereby helping improve the pixel density of display area.

In some embodiments, as shown in FIG. 6, the amplitude modulation circuit 11 includes the amplitude data write sub-module 113 configured to transmit the first data signal PAM_DATA to the amplitude driving sub-module 111. The pulse width modulation circuit 12 includes the pulse width data write sub-module 123 configured to transmit the second data signal PWM_DATA to the pulse width driving sub-module 121.

Exemplarily, as shown in FIG. 6, a control terminal of the amplitude reset sub-module 112 and a control terminal of the pulse width reset sub-module 122 may be connected to different scanning lines. A control terminal of the amplitude data write sub-module 113 and a control terminal of the pulse width data write sub-module 123 may be connected to different scanning lines. In the time of one frame of image, periods when scanning signals on different scanning lines at on-level are different.

As shown in FIG. 6, the control terminal of the amplitude reset sub-module 112 is connected to a scanning line PAM_S1. The control terminal of the amplitude data write sub-module 113 is connected to a scanning line PAM_S2. The control terminal of the pulse width reset sub-module 122 is connected to a scanning line PWM_S1. The control terminal of the pulse width data write sub-module 123 is connected to a scanning line PWM_S2.

In the time of one frame of image, the scanning line PAM_S1, the scanning line PAM_S2, the scanning line PWM_S1, and the scanning line PWM_S2 may provide potentials at on-level in a certain sequence.

Figure 7:
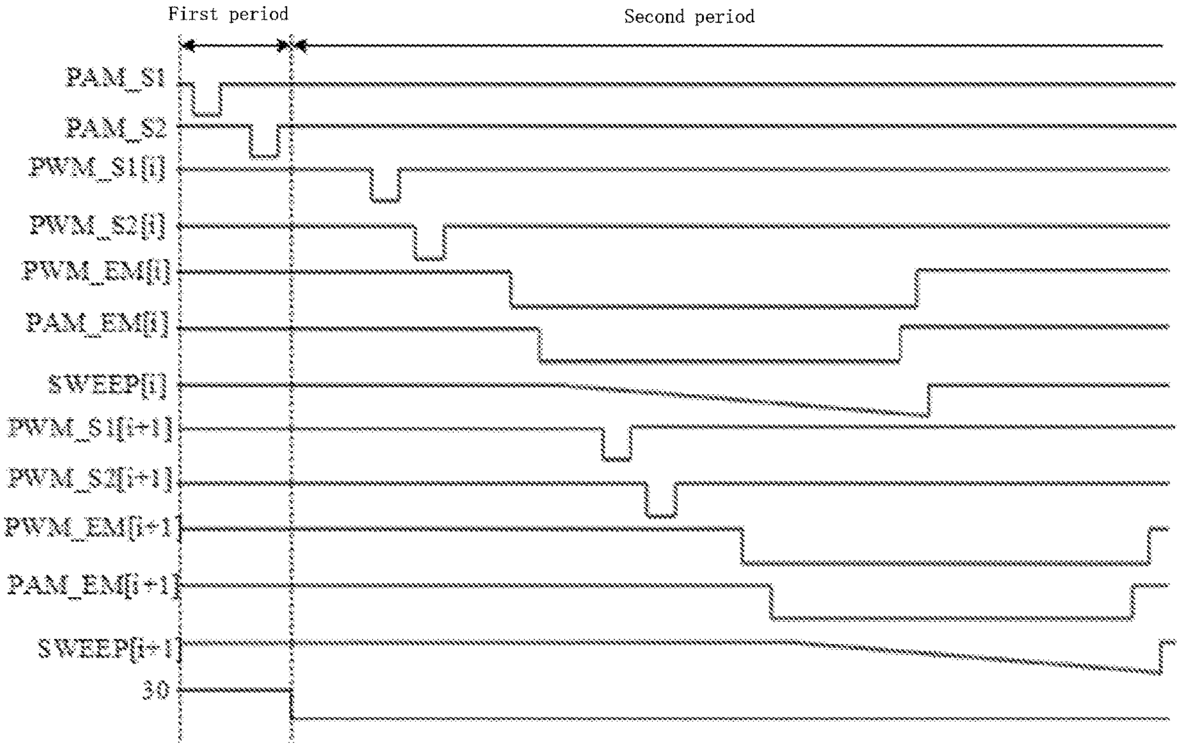
FIG. 7 is a timing graph of the circuit structure of FIG. 6.

In some embodiments, referring to FIGS. 6 and 7, the operating process of the display panel includes a first period and a second period in the time of one frame of image. The first period does not overlap the second period. In the first period, the reset signal line 30 is configured to transmit the first reset signal whose voltage value is Vref1. Moreover, in the first period, the scanning line PAM_S2 provides a potential at on-level, and the amplitude data write sub-module 113 is turned on. Additionally, in the first period, the scanning line PAM_S1 provides a potential at on-level, and the amplitude reset sub-module 112 is turned on.

In the second period, the reset signal line 30 is configured to transmit the second reset signal whose voltage value is Vref2. Moreover, in the second period, the scanning line PWM_S2 provides a potential at on-level, and the pulse width data write sub-module 123 is turned on. Additionally, in the second period, the scanning line PWM_S1 provides a potential at on-level, and the pulse width reset sub-module 122 is turned on.

It is to be noted that FIG. 7 illustrates that a low level is a potential at on-level. Additionally, PWM_S1[*i*] and PWM_S1[*i*+1] denote a scanning line connected to control terminals of pulse width reset sub-modules 122 in pixel circuits in the i-th row and a scanning line connected to control terminals of pulse width reset sub-modules 122 in pixel circuits in the (i+1)-th row respectively. PWM_S2[*i*] and PWM_S2[*i*+1] denote a scanning line connected to control terminals of pulse width data write sub-modules 123 in the pixel circuits in the i-th row and a scanning line connected to control terminals of pulse width data write sub-modules in the pixel circuits in the (i+1)-th row respectively.

In general, a control terminal of a driving sub-module is reset before a data signal is written to the driving sub-module. In embodiments of the present application, in the case where the amplitude modulation circuit 11 and the pulse width modulation circuit 12 share the same reset signal line 30, the amplitude data write sub-module 113 in the amplitude modulation circuit 11 is turned on in a period when the first reset signal required by the amplitude modulation circuit 11 is transmitted on the reset signal line 30, and the pulse width data write sub-module 123 in the pulse width modulation circuit 12 is turned on in a period when the second reset signal required by the pulse width modulation circuit 12 is transmitted on the reset signal line 30. In this case, the resetting of the amplitude driving sub-module and the resetting of the pulse width driving sub-module are implemented independently.

Exemplarily, as shown in FIG. 7, in the first period, for the same pixel circuit, the connected scanning line PAM_S1 may provide a potential at on-level first, and then the connected scanning line PAM_S2 provides a potential at on-level. In the second period, for the same pixel circuit, for example, a pixel circuit in the i-th row, the connected scanning line PWM_S1[*i*] may provide a potential at on-level first, and then the connected scanning line PWM_S2[*i*] provides a potential at on-level.

In some embodiments, the display panel includes multiple rows of pixel circuits 10. With continued reference to FIGS. 6 and 7, in the first period, scanning lines PAM_S1 connected to the multiple rows of pixel circuits 10 have the same signal so that amplitude reset sub-modules 112 in the multiple rows of pixel circuits 10 are turned on simultaneously. In the first period, scanning lines PAM_S2 connected to the multiple rows of pixel circuits 10 have the same signal so that amplitude data write sub-modules 113 in the multiple rows of pixel circuits 10 are turned on simultaneously.

In the second period, scanning lines PWM_S1 connected to the multiple rows of pixel circuits 10 provide potentials at on-level in sequence. For example, the scanning line PWM_S1[*i*] connected to the pixel circuits in the i-th row may provide a potential at on-level first, and then the scanning line PWM_S1[*i*+1] connected to the pixel circuits in the (i+1)-th row may provide a potential at on-level. In this case, pulse width reset sub-modules 122 in the multiple rows of pixel circuits 10 are turned on row by row. In the second period, scanning lines PWM_S2 connected to the multiple rows of pixel circuits 10 provide potentials at on-level in sequence. For example, the scanning line PWM_S2[*i*] connected to the pixel circuits in the i-th row may provide a potential at on-level first, and then the scanning line PWM_S2[*i*+1] connected to the pixel circuits in the (i+1)-th row may provide a potential at on-level. In this case, pulse width data write sub-modules 123 in the multiple rows of pixel circuits 10 are turned on row by row.

In embodiments of the present application, the amplitude reset sub-modules 112 in the multiple rows of pixel circuits 10 are turned on simultaneously so that the first reset signal is input globally and simultaneously. The amplitude data write sub-modules 113 in the multiple rows of pixel circuits 10 are turned on simultaneously so that the first data signal is input globally and simultaneously. The pulse width reset sub-modules 122 in the multiple rows of pixel circuits 10 are turned on row by row so that the second reset signal is input row by row. The pulse width data write sub-modules 123 in the multiple rows of pixel circuits 10 are turned on row by row so that the second data signal is input row by row. In the case where the second reset signal and the second data signal are input row by row, the pulse width of a respective driving current in pixel circuits in each row can be controlled and adjusted finely.

In some embodiments, the first period is before the second period.

Of course, in other examples, the first period may be after the second period.

Figure 8:
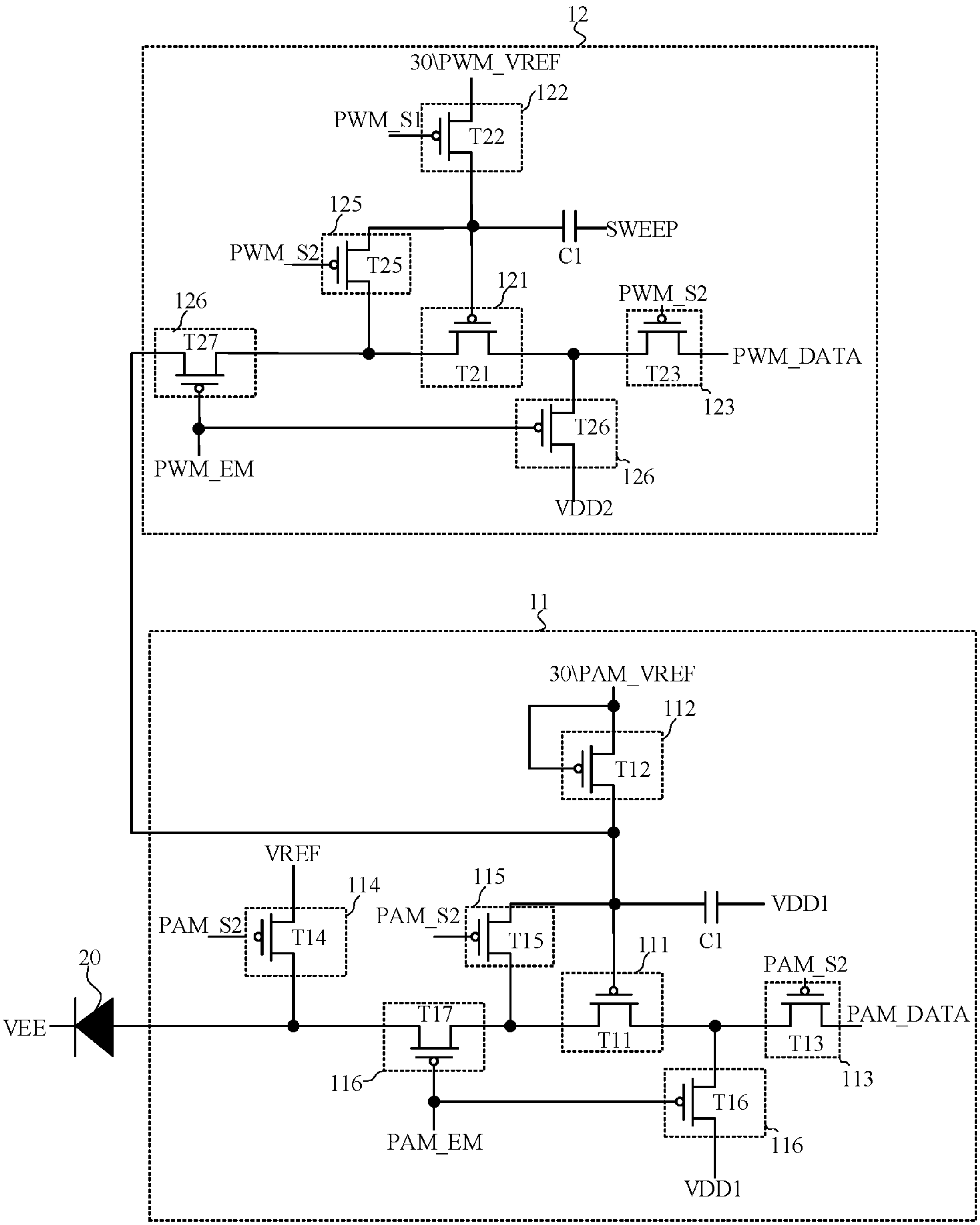
FIG. 8 is a structural diagram of another pixel circuit in a display panel according to an embodiment of the present application.

In some embodiments, as shown in FIG. 8, the amplitude reset sub-module 112 includes a first reset transistor T12. A first electrode of the first reset transistor T12 is electrically connected to the reset signal line 30. A second electrode of the first reset transistor T12 is electrically connected to the control terminal of the amplitude driving sub-module 111.

The pulse width reset sub-module 122 includes a second reset transistor T22. A first electrode of the second reset transistor T22 is electrically connected to the reset signal line 30. A second electrode of the second reset transistor T22 is electrically connected to the control terminal of the pulse width driving sub-module 121.

Figure 9:
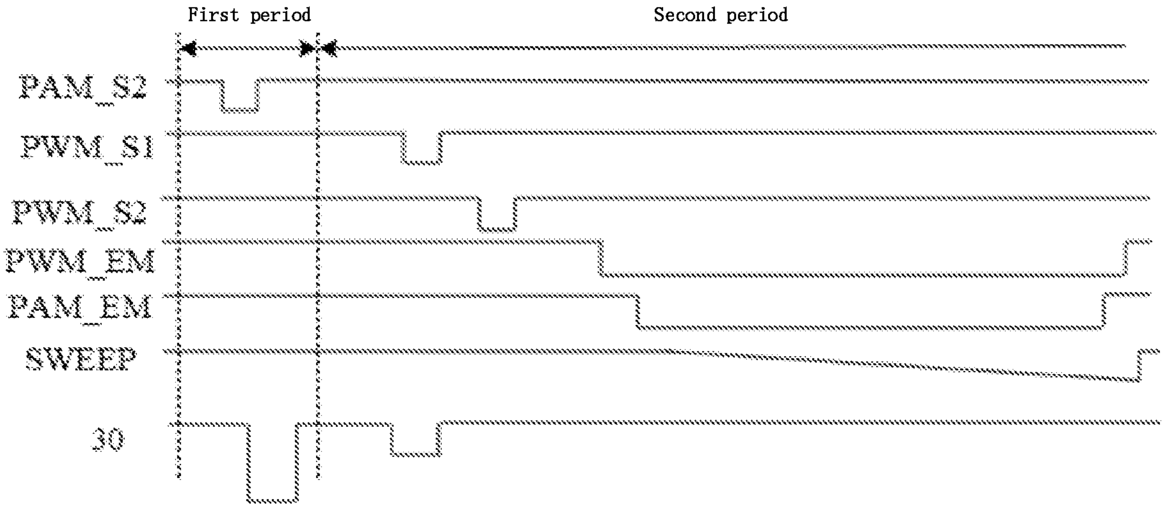
FIG. 9 is a timing graph of the circuit structure of FIG. 8.

Referring to FIGS. 8 and 9, in the case where Vref1<Vref2, a gate of the first reset transistor T12 is electrically connected to the reset signal line 30, and a gate of the second reset transistor T22 is electrically connected to the scanning line PWM_S1.

Figure 10:
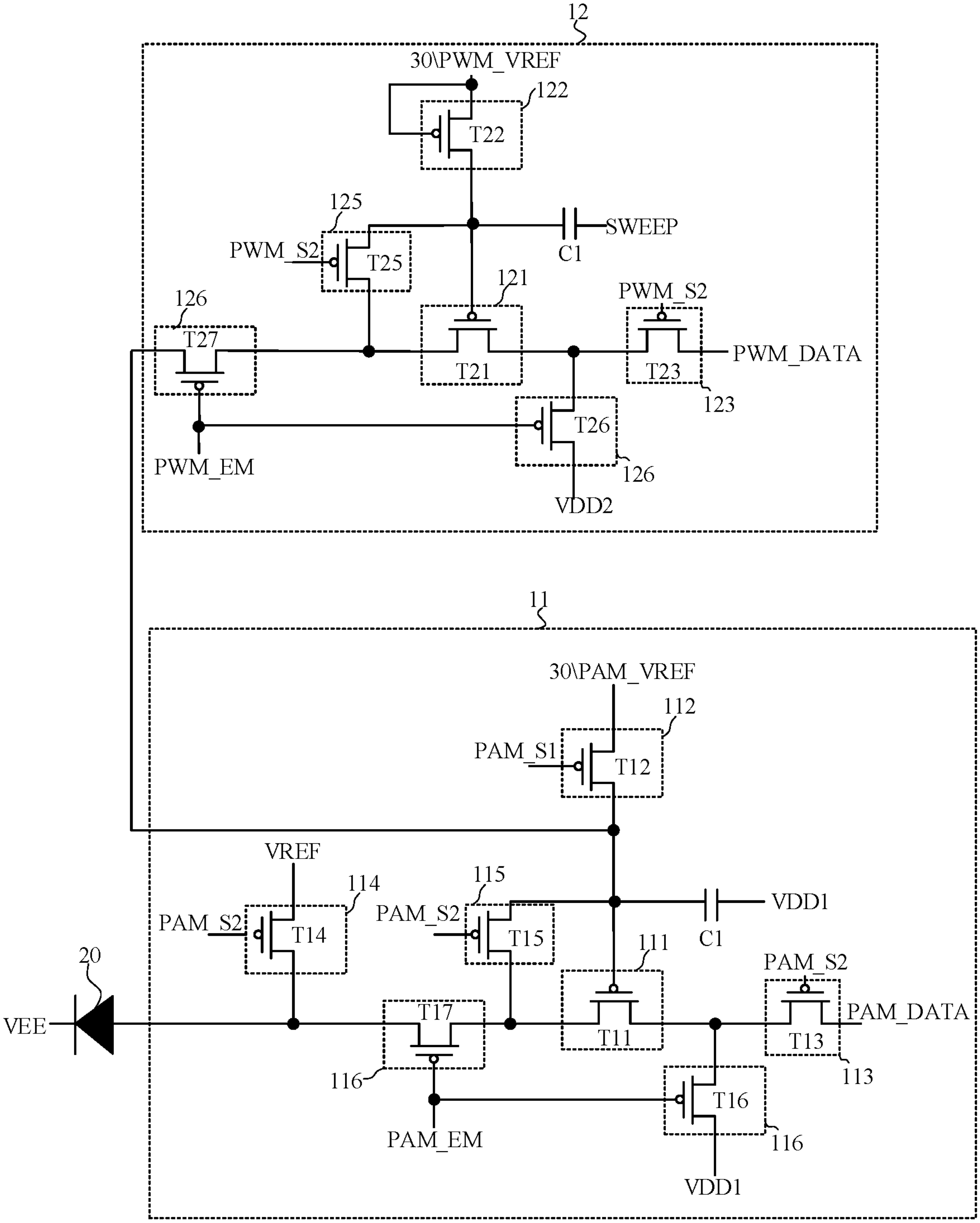
FIG. 10 is a structural diagram of another pixel circuit in a display panel according to an embodiment of the present application.
Figure 11:
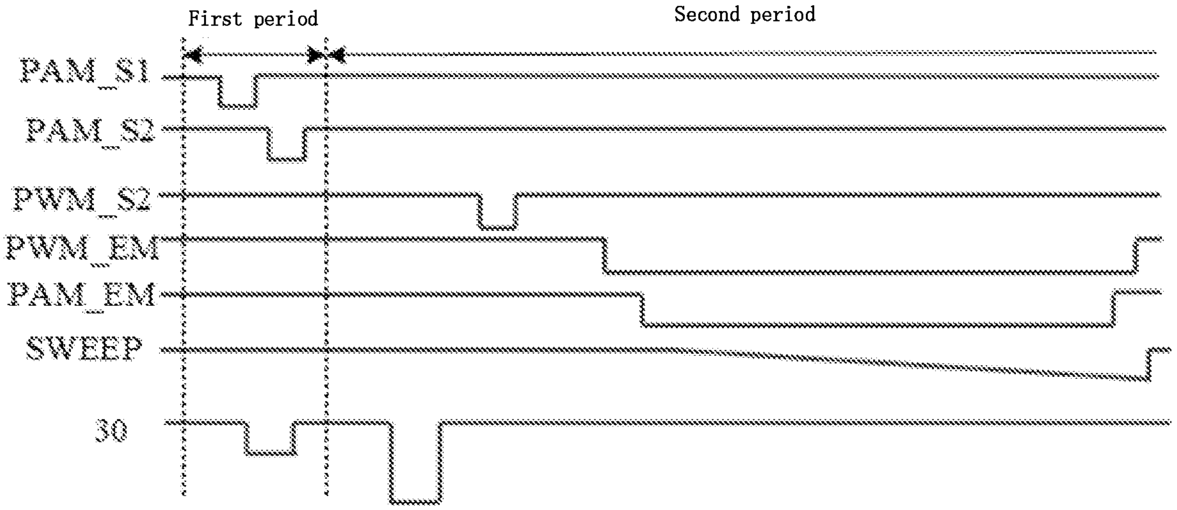
FIG. 11 is a timing graph of the circuit structure of FIG. 10.

Referring to FIGS. 10 and 11, in the case where Vref1>Vref2, the gate of the first reset transistor T12 is electrically connected to the scanning line PAM_S1, and the gate of the second reset transistor T22 is electrically connected to the reset signal line 30.

In embodiments of the present application, one of the first reset transistor T12 or the second reset transistor T22 which is connected to a lower reset voltage may constitute a diode model. For example, Vref1<Vref2. In the case where the first reset transistor T12 constitutes a diode model, at the end of the writing of the first reset signal, the voltage of the gate of the first reset transistor T12 is Vref1, and the voltage of the second electrode of the first reset transistor T12 is Vref1−Vth12 (that is, the difference between Vref1 and Vth12). Vth12 denotes the threshold voltage of the first reset transistor T12. Therefore, it guarantees that the reset voltage written to the control terminal of the amplitude driving sub-module 111 is relatively low.

It is to be understood that in the case where the gate of the first reset transistor T12 or the gate of the second reset transistor T22 is electrically connected to the reset signal line, one of the gate of the first reset transistor T12 or the gate of the second reset transistor T22 does not need to be connected to a scanning line, thereby reducing the number of scanning lines in the display panel.

Figure 12:
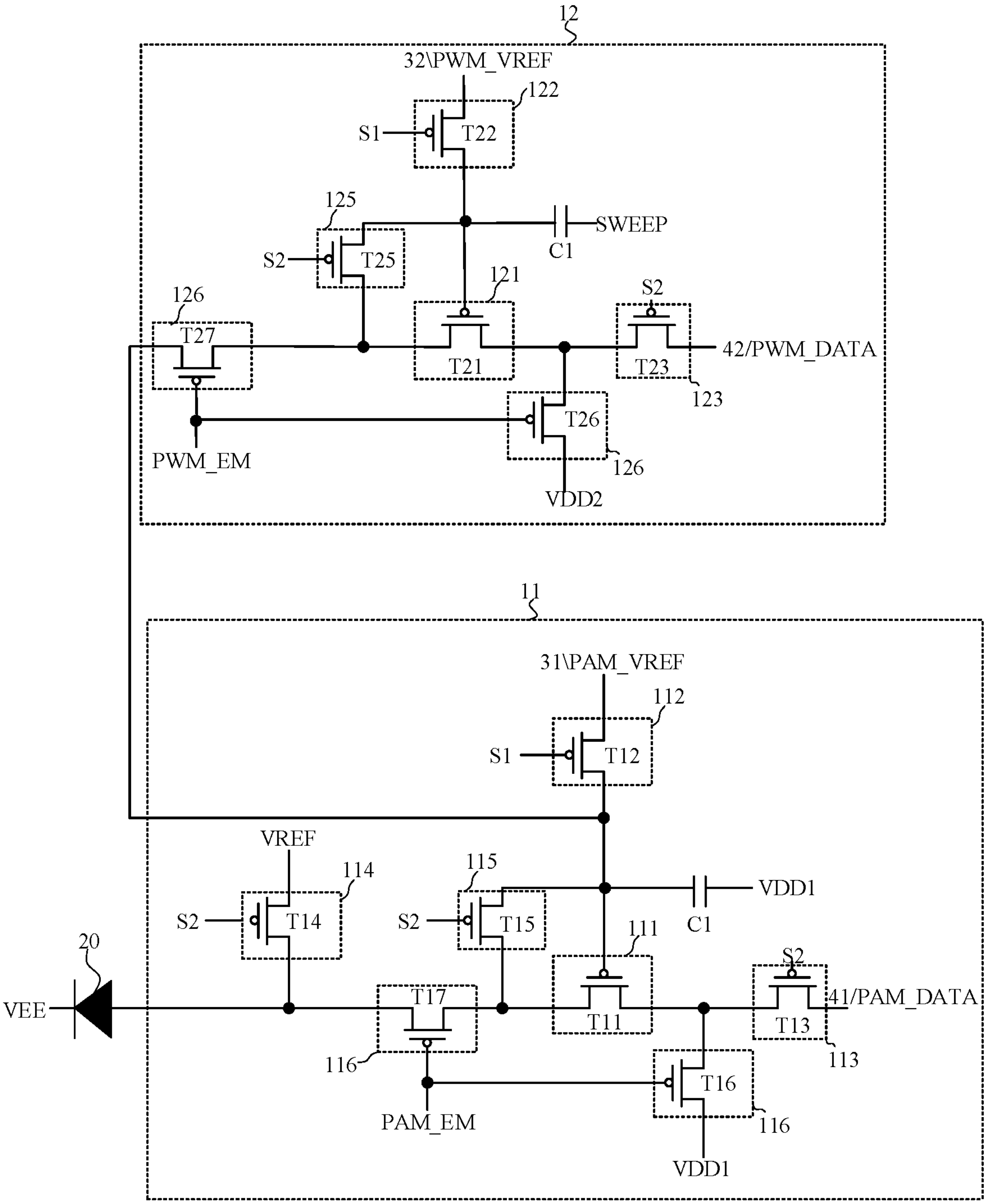
FIG. 12 is a structural diagram of another pixel circuit in a display panel according to an embodiment of the present application.

In some embodiments, as shown in FIG. 12, the amplitude reset sub-module 112 is electrically connected to a first reset signal line 31. The pulse width reset sub-module 122 is electrically connected to a second reset signal line 32. The first reset signal line 31 is configured to transmit the first reset signal. The second reset signal line 32 is configured to transmit the second reset signal.

In embodiments of the present application, Vref1≠Vref2. Moreover, different reset signal lines are configured to transmit different reset signals. Two types of reset signal lines are independent of each other, helping simplify the control timing of the display panel.

In some embodiments, as shown in FIG. 12, in the case where the amplitude reset sub-module 112 is electrically connected to the first reset signal line 31 and where the pulse width reset sub-module 122 is electrically connected to the second reset signal line 32, the control terminal of the amplitude reset sub-module 112 and the control terminal of the pulse width reset sub-module 122 may be electrically connected to the same first scanning line S1.

It is to be understood that the amplitude reset sub-module 112 and the pulse width reset sub-module 122 are each electrically connected to the first scanning line S1. Therefore, as shown in FIG. 12, the amplitude reset sub-module 112 and the pulse width reset sub-module 122 may be turned on simultaneously in a first stage t1. However, the amplitude reset sub-module 112 and the pulse width reset sub-module 122 are connected to different reset signal lines. In this case, even if the amplitude reset sub-module 112 and the pulse width reset sub-module 122 are turned on simultaneously, the amplitude reset sub-module 112 and the pulse width reset sub-module 122 can transmit reset signals of different magnitudes.

In some embodiments, as shown in FIG. 12, the amplitude modulation circuit 11 includes the amplitude data write sub-module 113 connected to a first data line 41. The first data line 41 may be configured to transmit the first data signal PAM_DATA.

The pulse width modulation circuit 12 includes the pulse width data write sub-module 123 connected to a second data line 42. The second data line 42 is configured to transmit the second data signal PWM_DATA. The control terminal of the amplitude data write sub-module 113 and the control terminal of the pulse width data write sub-module 123 are electrically connected to the same second scanning line S2.

Figure 13:
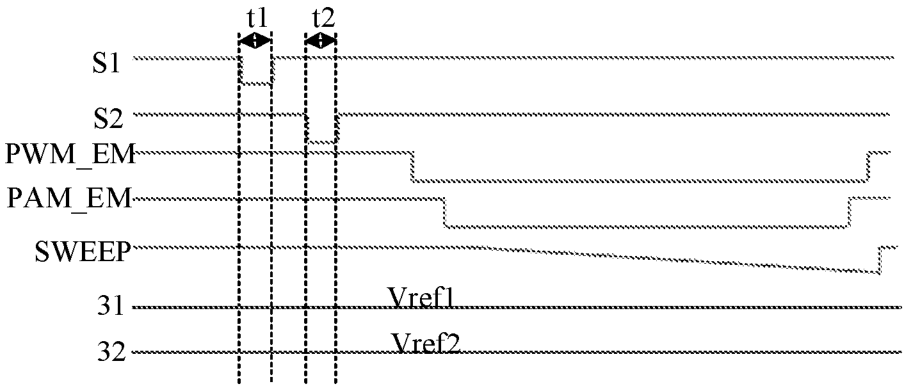
FIG. 13 is a timing graph of the circuit structure of FIG. 12.

It is to be understood that the amplitude data write sub-module 113 and the pulse width data write sub-module 123 are each connected to the second scanning line S2. Therefore, as shown in FIG. 13, the amplitude data write sub-module 113 and the pulse width data write sub-module 123 may be turned on simultaneously in a stage t2. However, the amplitude data write sub-module 113 and the pulse width data write sub-module 123 are connected to different data lines. In this case, even if the amplitude data write sub-module 113 and the pulse width data write sub-module 123 are turned on simultaneously, the amplitude data write sub-module 113 and the pulse width data write sub-module 123 can transmit data signals of different magnitudes.

Figure 14:
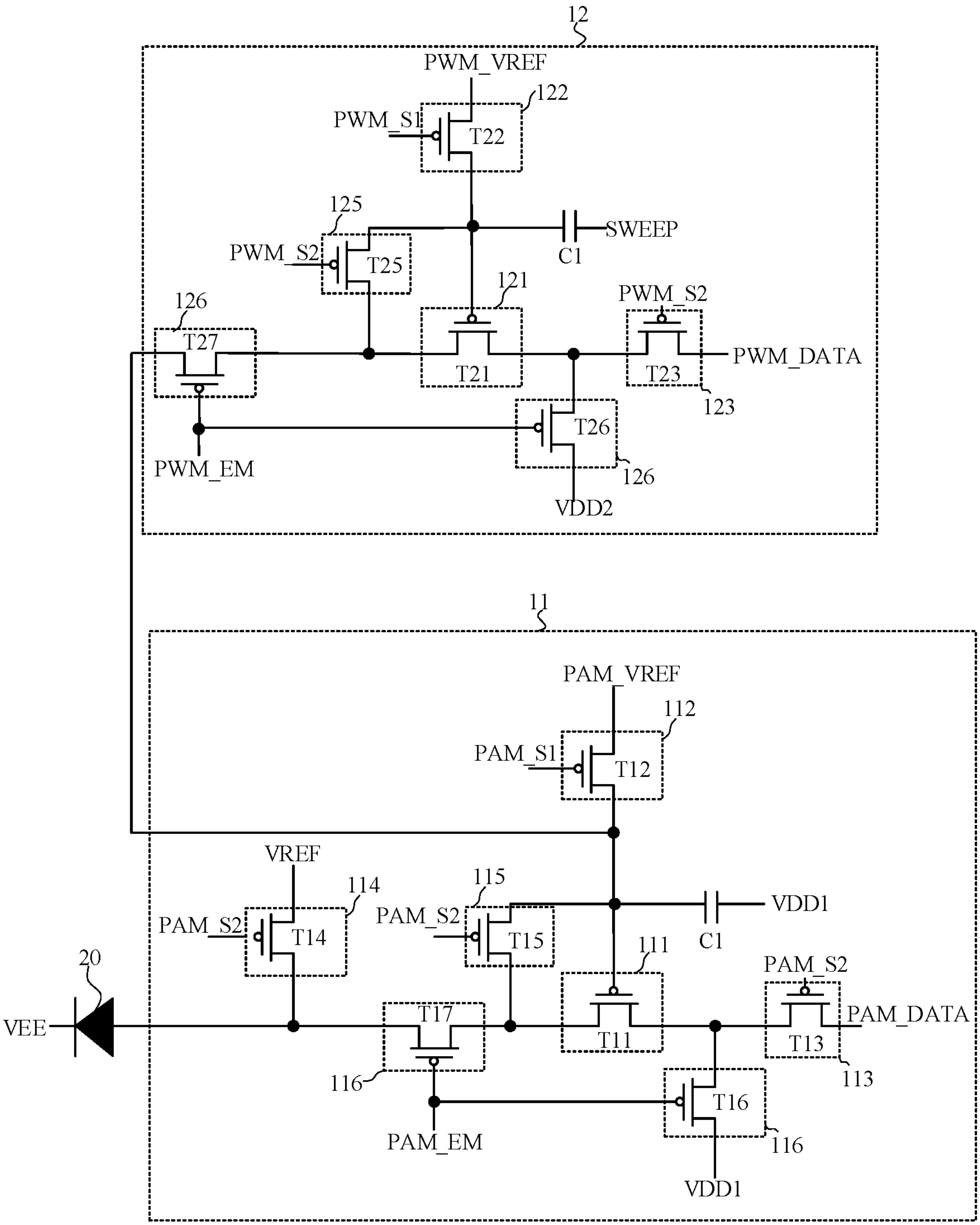
FIG. 14 is a structural diagram of another pixel circuit in a display panel according to an embodiment of the present application.

As an example, as shown in FIG. 14, the amplitude modulation circuit 11 includes a first driving transistor T11. The pulse width modulation circuit 12 is connected to a gate of the first driving transistor T11.

Figure 15:
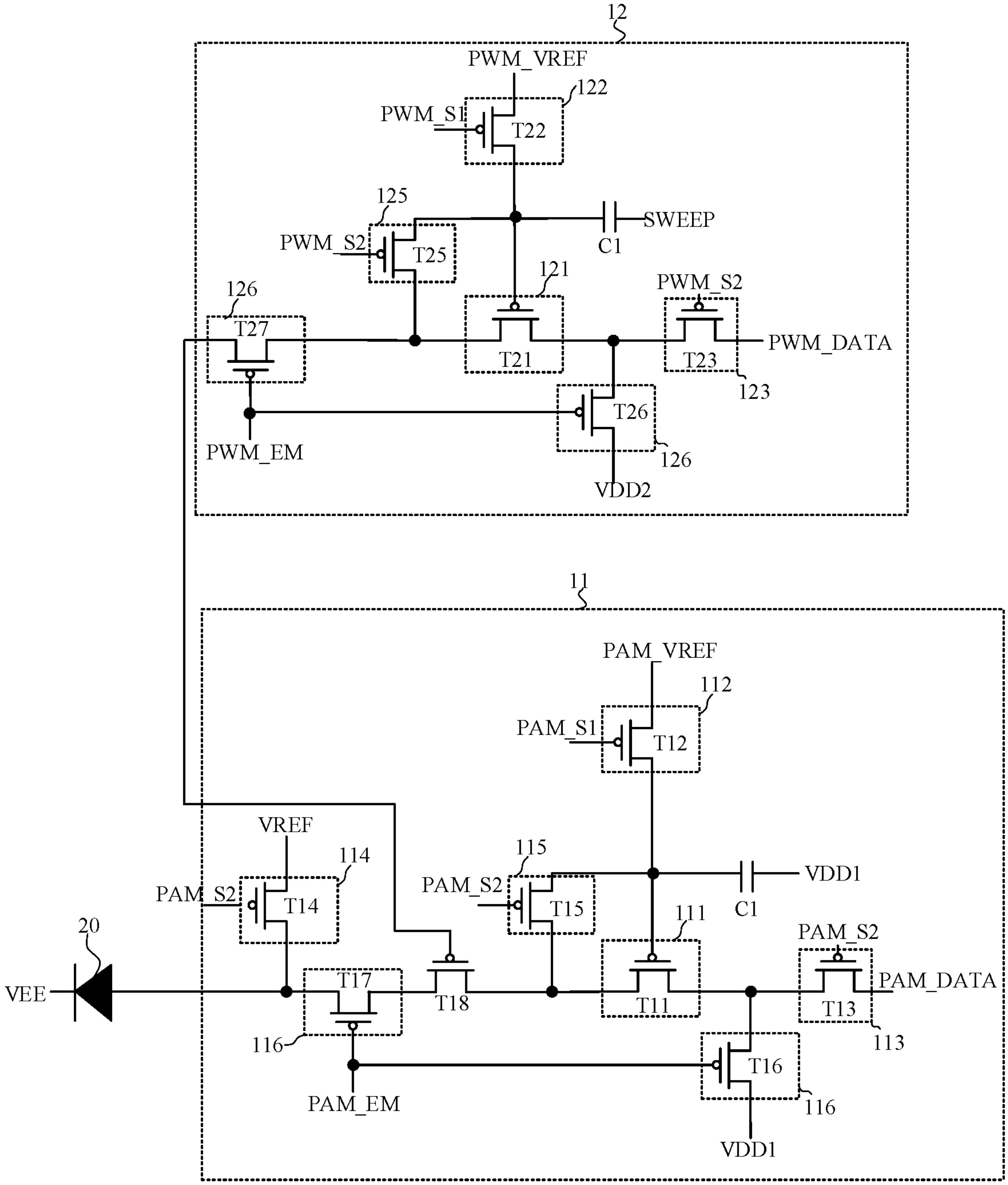
FIG. 15 is a structural diagram of another pixel circuit in a display panel according to an embodiment of the present application.

In another example, as shown in FIG. 15, the amplitude modulation circuit 11 includes the first driving transistor T11 and a control transistor T18. The control transistor T18 is connected between the first driving transistor T11 and the light-emitting element 20. The pulse width modulation circuit 12 is connected to a gate of the control transistor T18.

Figure 16:
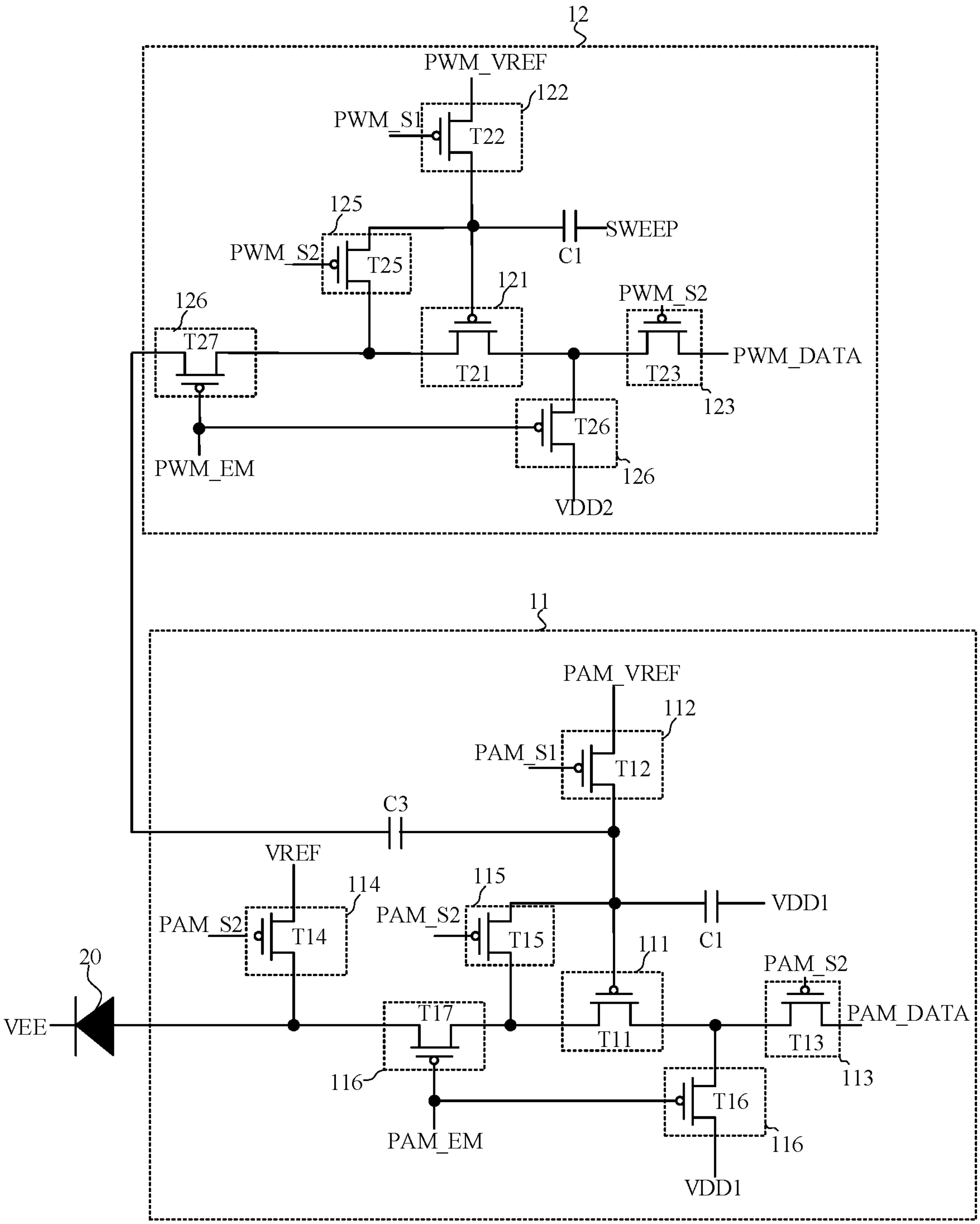
FIG. 16 is a structural diagram of another pixel circuit in a display panel according to an embodiment of the present application.

In another example, as shown in FIG. 16, the amplitude modulation circuit 11 includes the first driving transistor T11. The pixel circuit 10 further includes a connection capacitor C3. The pulse width modulation circuit 12 is connected to a gate of the first driving transistor T11 through the connection capacitor C3.

Exemplarily, as shown in any one of FIGS. 14 to 16, the amplitude modulation circuit 11 may further include a first compensation sub-module 115. The first compensation sub-module 115 is connected between the control terminal of the amplitude driving sub-module 111 and a second end of the amplitude driving sub-module 111 and is configured to compensate for the threshold voltage of the amplitude driving sub-module 111. A control terminal of the first compensation sub-module 115 may be connected to the scanning line PAM_S2.

The amplitude modulation circuit 11 may further include first light emission control circuits 116. One of the first light emission control circuits 116 may be connected between a first power line VDD1 and the first terminal of the amplitude driving sub-module 111. The other of the first light emission control circuits 116 may be connected between the second end of the amplitude driving sub-module 111 and the light-emitting element 20. A control terminal of each first light emission control circuit 116 may be connected to a first light emission control signal line PAM_EM.

The amplitude modulation circuit 11 may further include a first capacitor C1. A first terminal of the first capacitor C1 is connected to the first power line VDD1. A second end of the first capacitor C1 is connected to the control terminal of the amplitude driving sub-module 111.

The pulse width modulation circuit 12 may further include a second compensation sub-module 125. The second compensation sub-module 125 is connected between the control terminal of the pulse width driving sub-module 121 and a second end of the pulse width driving sub-module 121 and is configured to compensate for the threshold voltage of the pulse width driving sub-module 121. A control terminal of the second compensation sub-module 125 may be connected to the scanning line PWM_S2.

The pulse width modulation circuit 12 may further include second light emission control circuits 126. One of the second light emission control circuits 126 may be connected between a second power line VDD2 and the first terminal of the pulse width driving sub-module 121. The other of the second light emission control circuits 126 may be connected between the second end of the pulse width driving sub-module 121 and the amplitude modulation circuit 11.

The pulse width modulation circuit 12 may further include a second capacitor C2. A first terminal of the second capacitor C2 accesses a sweep signal SWEEP. A second end of the second capacitor C2 is connected to the control terminal of the pulse width driving sub-module 121. The sweep signal SWEEP may be a ramp signal in the shape of a triangular wave in which the voltage value varies with time linearly. The pulse width modulation circuit 12 controls, according to the sweep signal SWEEP, the pixel circuit 10 to provide the duty cycle of the driving current for the light-emitting element in a light emission stage, thereby controlling the brightness of the light-emitting element. That is, the greater the duty cycle, the higher the brightness of the light-emitting element perceived by the human eye; and the smaller the duty cycle, the lower the brightness of the light-emitting element perceived by the human eye.

Exemplarily, the amplitude modulation circuit 11 includes the first driving transistor T11. The amplitude reset sub-module 112 includes the first reset transistor T12. The amplitude data write sub-module 113 includes a first data write transistor T13. The anode reset sub-module 114 includes a third reset transistor T14. The first compensation sub-module 115 includes a first compensation transistor T15. The two first light emission control sub-modules include a transistor T16 and a transistor T17 separately.

The pulse width driving sub-module 121 includes a second driving transistor T12. The pulse width reset sub-module 122 includes the second reset transistor T22. The pulse width data write sub-module 123 includes a second data write transistor T23. The second compensation sub-module 125 includes a second compensation transistor T25. The two second light emission control sub-modules include a transistor T26 and a transistor T27 separately.

It is to be noted that a transistor in embodiments of the present application may be an n-type transistor or a p-type transistor. For an n-type transistor, the on-level is a logic high level, and the off-level is a logic low level. That is, when the potential of a gate of the n-type transistor is at a logic high level, a first electrode of the n-type transistor and a second electrode of the n-type transistor are turned on. When the potential of the gate of the n-type transistor is at a logic low level, the first electrode of the n-type transistor and the second electrode of the n-type transistor are turned off. For a p-type transistor, the on-level is a logic low level, and the off-level is a logic high level. That is, when the potential of a gate of the p-type transistor is at a logic low level, a first electrode of the p-type transistor and a second electrode of the p-type transistor are turned on. When the potential of the gate of the p-type transistor is at a high level, the first electrode of the p-type transistor and the second electrode of the p-type transistor are turned off. During specific implementation, a gate of each preceding transistor is used as a control electrode. Moreover, according to the signal and type of the gate of each transistor, a first electrode of each transistor may be used as a source, and a second electrode of each transistor may be used as a drain. Alternatively, the first electrode of each transistor may be used as a drain, and the second electrode of each transistor may be used as a source. No distinction is made here. Additionally, in embodiments of the present application, the on-level refers to any level that can get a transistor turned on, and the off-level refers to any level that can get the transistor cut off/turned off.

Based on the same inventive concept, embodiments of the present application further provide a driving method of a display panel. As shown in FIG. 1, the display panel includes pixel circuits 10 and light-emitting elements 20.

As shown in FIG. 2, a pixel circuit 10 includes an amplitude modulation circuit 11 and a pulse width modulation circuit 12. The amplitude modulation circuit 11 is connected to the pulse width modulation circuit 12. The pixel circuit 10 generates a driving current in the control of the amplitude modulation circuit 11 and the pulse width modulation circuit 12. The amplitude modulation circuit 11 may be configured to control the amplitude of the driving current. The pulse width modulation circuit 12 may be configured to control the pulse width of the driving current.

The amplitude modulation circuit 11 includes an amplitude driving sub-module 111 and an amplitude reset sub-module 112. The amplitude reset sub-module 112 is connected to a control terminal of the amplitude driving sub-module 111 and is configured to transmit a first reset signal PAM_REF to the control terminal of the amplitude driving sub-module 111. The first reset signal PAM_REF may be configured to reset the potential of the control terminal of the amplitude driving sub-module 111.

The pulse width modulation circuit 12 includes a pulse width driving sub-module 121 and a pulse width reset sub-module 122. The pulse width reset sub-module 122 is connected to a control terminal of the pulse width driving sub-module 121 and is configured to transmit a second reset signal PWM_REF to a control terminal of the pulse width driving sub-module 121. The second reset signal PWM_REF may be configured to reset the potential of the control terminal of the pulse width driving sub-module 121.

Figures 17, 18:
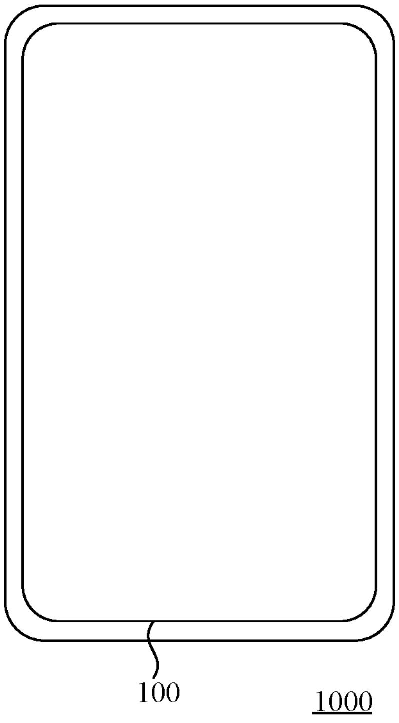
FIG. 17 is a flowchart of a driving method of a display panel according to an embodiment of the present application.
FIG. 18 is a structural diagram of a display device according to an embodiment of the present application.

As shown in FIG. 17, the driving method of a display panel may include step 171.

In step 171, the voltage value of the first reset signal is controlled to be Vref1, and the voltage value of the second reset signal is controlled to be Vref2, where Vref1≠Vref2.

According to driving method of a display panel provided in embodiments of the present application, Vref1≠Vref2. That is, the amplitude driving sub-module 111 and the pulse width driving sub-module 121 are reset by different reset voltages, better meeting different requirements of the amplitude driving sub-module 111 and the pulse width driving sub-module 121, thereby better exerting functions of the amplitude modulation circuit 11 and functions of the pulse width modulation circuit 12, and thereby improving design rationality.

In some embodiments, Vref1<Vref2.

In some embodiments, Vref1>Vref2.

In some embodiments, the amplitude modulation circuit includes an amplitude data write sub-module configured to transmit a first data signal to the amplitude driving sub-module.

The pulse width modulation circuit includes a pulse width data write sub-module configured to transmit a second data signal to the pulse width driving sub-module.

The driving method of a display panel may further include the step below.

The voltage value of the first data signal is controlled to be Vdata1, and the voltage value of the second data signal is controlled to be Vdata2, where Vdata1≠Vdata2.

In some embodiments, Vdata1<Vdata2.

In some embodiments, driving transistors in the pixel circuit include p-type transistors.

In some embodiments, Vdata1>Vdata2.

In some embodiments, driving transistors in the pixel circuit include n-type transistors.

In some embodiments, the amplitude reset sub-module and the pulse width reset sub-module are electrically connected to the same reset signal line. The reset signal line is configured to transmit the first reset signal and the second reset signal in a time-sharing manner.

In some embodiments, the amplitude modulation circuit includes the amplitude data write sub-module configured to transmit the first data signal to the amplitude driving sub-module.

The pulse width modulation circuit includes the pulse width data write sub-module configured to transmit the second data signal to the pulse width driving sub-module.

The operating process of the display panel includes a first period and a second period in the time of one frame of image. The first period does not overlap the second period.

The driving method of a display panel may further include the steps below.

In the first period, the reset signal line is controlled to transmit the first reset signal, and the amplitude data write sub-module is controlled to be turned on.

In the second period, the reset signal line is controlled to transmit the second reset signal, and the pulse width data write sub-module is controlled to be turned on.

In some embodiments, the display panel includes multiple rows of pixel circuits.

The driving method of a display panel may further include the steps below.

In the first period, amplitude reset sub-modules in the multiple rows of pixel circuits are controlled to be turned on simultaneously, and amplitude data write sub-modules in the multiple rows of pixel circuits are controlled to be turned on simultaneously.

In the second period, pulse width reset sub-modules in the multiple rows of pixel circuits are controlled to be turned on line by line, and pulse width data write sub-modules in the multiple rows of pixel circuits are controlled to be turned on line by line.

In some embodiments, the first period is controlled to be before the second period.

In some embodiments, a control terminal of the amplitude reset sub-module and a control terminal of the pulse width reset sub-module are connected to different scanning lines.

In some embodiments, the amplitude reset sub-module includes a first reset transistor. A first electrode of the first reset transistor is electrically connected to the reset signal line. A second electrode of the first reset transistor is electrically connected to the control terminal of the amplitude driving sub-module.

The pulse width reset sub-module includes a second reset transistor. A first electrode of the second reset transistor is electrically connected to the reset signal line, and a second electrode of the second reset transistor is electrically connected to the control terminal of the pulse width driving sub-module.

In the case where Vref1<Vref2, a gate of the first reset transistor is electrically connected to the reset signal line, and a gate of the second reset transistor is electrically connected to a scanning line.

In the case where Vref1>Vref2, the gate of the first reset transistor is electrically connected to the scanning line, and the gate of the second reset transistor is electrically connected to the reset signal line.

In some embodiments, the amplitude reset sub-module is electrically connected to a first reset signal line. The pulse width reset sub-module is electrically connected to a second reset signal line.

The first reset signal line is configured to transmit the first reset signal. The second reset signal line is configured to transmit the second reset signal.

In some embodiments, the control terminal of the amplitude reset sub-module and the control terminal of the pulse width reset sub-module are connected to the same first scanning line.

In some embodiments, the amplitude modulation circuit includes the amplitude data write sub-module connected to a first data line.

The pulse width modulation circuit includes the pulse width data write sub-module connected to a second data line.

A control terminal of the amplitude data write sub-module and a control terminal of the pulse width data write sub-module are electrically connected to the same second scanning line.

In some embodiments, the pixel circuits include a first pixel circuit and a second pixel circuit. The light-emitting elements include a first light-emitting element and a second light-emitting element. The first pixel circuit is configured to drive the first light-emitting element. The second pixel circuit is configured to drive the second light-emitting element. The emitted color of the first light-emitting element is different from the emitted color of the second light-emitting element.

The voltage value of the first reset signal transmitted by an amplitude reset sub-module in the first pixel circuit is Vref11. The voltage value of the second reset signal transmitted by a pulse width driving sub-module in the first pixel circuit is Vref21.

The voltage value of the first reset signal transmitted by an amplitude reset sub-module in the second pixel circuit is Vref12. The voltage value of the second reset signal transmitted by a pulse width driving sub-module in the second pixel circuit is Vref22.

Vref11≠Vref12, and/or Vref21≠Vref22.

In some embodiments, the amplitude modulation circuit includes the amplitude data write sub-module configured to transmit the first data signal to the amplitude driving sub-module.

The pulse width modulation circuit includes the pulse width data write sub-module configured to transmit the second data signal to the pulse width driving sub-module.

The voltage value of the first data signal written by an amplitude data write sub-module in the first pixel circuit is Vdata11. The voltage value of the second data signal written by a pulse width data write sub-module in the first pixel circuit is Vdata21.

The voltage value of the first data signal written by an amplitude data write sub-module in the second pixel circuit is Vdata12. The voltage value of the second data signal written by a pulse width data write sub-module in the second pixel circuit is Vdata22.

Vdata11≠Vdata12, and/or Vdata21≠Vdata22.

In some embodiments, the first light-emitting element includes a red light-emitting element. The second light-emitting element includes at least one of a green light-emitting element or a blue light-emitting element.

Driving transistors in the pixel circuit includes p-type transistors. Vdata11<Vdata12, and Vref11<Vref12; and/or Vdata21>Vdata22, and Vref21>Vref22.

Alternatively, driving transistors in the pixel circuit include n-type transistors. Vdata11>Vdata12, and Vref11>Vref12; and/or Vdata21<Vdata22, and Vref21<Vref22.

In some embodiments, data refresh rates of the display panel include a first data refresh rate and a second data refresh rate.

Under the first data refresh rate, the voltage value of the first reset signal is Vref13, and the voltage value of the second reset signal is Vref23.

Under the second data refresh rate, the voltage value of the first reset signal is Vref14, and the voltage value of the second reset signal is Vref24.

$$|Vref13-Vref23|\neq|Vref14-Vref24|.$$

In some embodiments, the first data refresh rate is greater than the second data refresh rate.

$$|Vref13-Vref23|>|Vref14-Vref24|, \text{ or } |Vref13-Vref23|<|Vref14-Vref24|.$$

In some embodiments, operating modes of the display panel include a first mode and a second mode. The brightness of the display panel in the first mode is different from the brightness of the display panel in the second mode.

In the first mode, the voltage value of the first reset signal is Vref15, and the voltage value of the second reset signal is Vref25.

In the second mode, the voltage value of the first reset signal is Vref16, and the voltage value of the second reset signal is Vref26.

$$|Vref15-Vref25|\neq|Vref16-Vref26|.$$

In some embodiments, the brightness of the display panel in the first mode is less than the brightness of the display panel in the second mode.

$$|Vref15-Vref25|<|Vref16-Vref26|.$$

In some embodiments, the amplitude modulation circuit further includes an anode reset sub-module configured to transmit a third reset signal to an anode of a light-emitting element.

The voltage value of the third reset signal is Vref3. Vref3≠Vref2.

In some embodiments, Vref3<Vref2.

In some embodiments, the amplitude modulation circuit includes a first driving transistor. The pulse width modulation circuit is connected to a gate of the first driving transistor.

In some embodiments, the amplitude modulation circuit includes the first driving transistor and a control transistor. The control transistor is connected between the first driving transistor and the light-emitting element.

The pulse width modulation circuit is connected to a gate of the control transistor.

In some embodiments, the amplitude modulation circuit includes the first driving transistor. The pixel circuit further includes a connection capacitor. The pulse width modulation circuit is connected to the gate of the first driving transistor through the connection capacitor.

Based on the same inventive concept, embodiments of the present application further provide a display device including the display panel provided in any embodiment of the present application. Referring to FIG. 18, FIG. 18 is a structural diagram of a display device according to an embodiment of the present application. The display device 1000 provided in FIG. 18 includes the display panel 100 provided in any preceding embodiment of the present application. In the embodiment of FIG. 18, an example where the display device 1000 is a mobile phone is used for description. It is to be understood that the display device provided in embodiments of the present application may be a wearable product, a computer, a television, an in-vehicle display device or another display device with a display function, which is not specifically limited in the present application. The display device provided in embodiments of the present application has the beneficial effects of the display panel according to embodiments of the present application. For details, reference may be made to the specific description of the display panel in the preceding embodiments, and the details are not repeated here in this embodiment.

According to embodiments of the present application as described above, these embodiments do not describe all details, nor do they limit the present application to only the specific embodiments described. Apparently, many modifications and variations are possible in light of the preceding description. This specification selects and specifically describes these embodiments to better explain the principles and practical applications of the present application so that those skilled in the art can make good use of the present application and the modification based on the present application. The present application is limited only by the claims, along with the full scope and equivalents of the claims.

What is claimed is:

1. A display panel, comprising pixel circuits and light-emitting elements, wherein a pixel circuit among the pixel circuits comprises an amplitude modulation circuit and a pulse width modulation circuit;

the amplitude modulation circuit comprises an amplitude driving sub-module and an amplitude reset sub-module, wherein the amplitude reset sub-module is configured to transmit a first reset signal to a control terminal of the amplitude driving sub-module;

the pulse width modulation circuit comprises a pulse width driving sub-module and a pulse width reset sub-module, wherein the pulse width reset sub-module is configured to transmit a second reset signal to a control terminal of the pulse width driving sub-module; and a voltage value of the first reset signal is Vref1, and a voltage value of the second reset signal is Vref2; wherein the amplitude modulation circuit comprises an amplitude data write sub-module configured to transmit a first data signal to the amplitude driving sub-module;

the pulse width modulation circuit comprises a pulse width data write sub-module configured to transmit a second data signal to the pulse width driving sub-module; and a voltage value of the first data signal is Vdata1, a voltage value of the second data signal is Vdata2; and wherein Vdata1<Vdata2, Vref1<Vref2;

wherein the amplitude reset sub-module is electrically connected to a first reset signal line, and the pulse width reset sub-module is electrically connected to a second reset signal line; and the first reset signal line is configured to transmit the first reset signal, and the second reset signal line is configured to transmit the second reset signal; and wherein the amplitude modulation circuit comprises an amplitude data write sub-module connected to a first data line;

the pulse width modulation circuit comprises a pulse width data write sub-module connected to a second data line; and a control terminal of the amplitude data write sub-module and a control terminal of the pulse width data write sub-module are electrically connected to a same second scanning line.

2. The display panel of claim 1, wherein the amplitude reset sub-module and the pulse width reset sub-module are electrically connected to a same reset signal line, and the reset signal line is configured to transmit the first reset signal and the second reset signal in a time-sharing manner.

3. The display panel of claim 2, wherein the amplitude modulation circuit comprises an amplitude data write sub-module configured to transmit the first data signal to the amplitude driving sub-module;

the pulse width modulation circuit comprises a pulse width data write sub-module configured to transmit the second data signal to the pulse width driving sub-module;

an operating process of the display panel comprises a first period and a second period in time of one frame of image, wherein the first period does not overlap the second period;

in the first period, the reset signal line is configured to transmit the first reset signal, and the amplitude data write sub-module is turned on; and in the second period, the reset signal line is configured to transmit the second reset signal, and the pulse width data write sub-module is turned on.

4. The display panel of claim 3, comprising multiple rows of pixel circuits, wherein in the first period, amplitude reset sub-modules in the multiple rows of pixel circuits are turned on simultaneously, and amplitude data write sub-modules in the multiple rows of pixel circuits are turned on simultaneously; and in the second period, pulse width reset sub-modules in the multiple rows of pixel circuits are turned on row by row, and pulse width data write sub-modules in the multiple rows of pixel circuits are turned on row by row.

5. The display panel of claim 4, wherein the first period is before the second period; or wherein a control terminal of the amplitude reset sub-module and a control terminal of the pulse width reset sub-module are connected to different scanning lines.

6. The display panel of claim 3, wherein the amplitude reset sub-module comprises a first reset transistor, a first electrode of the first reset transistor is electrically connected to the reset signal line, and a second electrode of the first reset transistor is electrically connected to the control terminal of the amplitude driving sub-module;

the pulse width reset sub-module comprises a second reset transistor, a first electrode of the second reset transistor is electrically connected to the reset signal line, and a second electrode of the second reset transistor is electrically connected to the control terminal of the pulse width driving sub-module;

in the case where Vref1<Vref2, a gate of the first reset transistor is electrically connected to the reset signal line, and a gate of the second reset transistor is electrically connected to a scanning line.

7. The display panel of claim 1, wherein a control terminal of the amplitude reset sub-module and a control terminal of the pulse width reset sub-module are connected to a same first scanning line.

8. The display panel of claim 1, wherein the pixel circuits comprise a first pixel circuit and a second pixel circuit, the light-emitting elements comprise a first light-emitting element and a second light-emitting element, the first pixel circuit is configured to drive the first light-emitting element, the second pixel circuit is configured to drive the second light-emitting element, and an emitted color of the first light-emitting element is different from an emitted color of the second light-emitting element;

a voltage value of the first reset signal transmitted by an amplitude reset sub-module in the first pixel circuit is Vref11, and a voltage value of the second reset signal transmitted by a pulse width driving sub-module in the first pixel circuit is Vref21; and a voltage value of the first reset signal transmitted by an amplitude reset sub-module in the second pixel circuit is Vref12, and a voltage value of the second reset signal transmitted by a pulse width driving sub-module in the second pixel circuit is Vref22;

wherein Vref11≠Vref12, and/or Vref21≠Vref22.

9. The display panel of claim 1, wherein operating modes of the display panel comprise a first mode and a second mode, wherein brightness of the display panel in the first mode is different from brightness of the display panel in the second mode;

in the first mode, the voltage value of the first reset signal is Vref15, and the voltage value of the second reset signal is Vref25; and in the second mode, the voltage value of the first reset signal is Vref16, and the voltage value of the second reset signal is Vref26;

wherein |Vref15−Vref25|≠|Vref16−Vref26|.

10. The display panel of claim 9, wherein the brightness of the display panel in the first mode is less than the brightness of the display panel in the second mode, wherein $$|Vref15-Vref25|<|Vref16-Vref26|.$$

11. The display panel of claim 1, wherein the amplitude modulation circuit further comprises an anode reset sub-module configured to transmit a third reset signal to an anode of one of the light-emitting elements; and a voltage value of the third reset signal is Vref3, wherein Vref3≠Vref2.

12. A display apparatus, comprising a display panel according to claim 1.

13. A driving method of a display panel, wherein the display panel comprises pixel circuits and light-emitting elements;

a pixel circuit among the pixel circuits comprises an amplitude modulation circuit and a pulse width modulation circuit;

the amplitude modulation circuit comprises an amplitude driving sub-module and an amplitude reset sub-module, wherein the amplitude reset sub-module is configured to transmit a first reset signal to a control terminal of the amplitude driving sub-module;

the pulse width modulation circuit comprises a pulse width driving sub-module and a pulse width reset sub-module, wherein the pulse width reset sub-module is configured to transmit a second reset signal to a control terminal of the pulse width driving sub-module; and wherein the amplitude reset sub-module is electrically connected to a first reset signal line, and the pulse width reset sub-module is electrically connected to a second reset signal line; and the first reset signal line is configured to transmit the first reset signal, and the second reset signal line is configured to transmit the second reset signal; and wherein the amplitude modulation circuit comprises an amplitude data write sub-module connected to a first data line;

the pulse width modulation circuit comprises a pulse width data write sub-module connected to a second data line; and a control terminal of the amplitude data write sub-module and a control terminal of the pulse width data write sub-module are electrically connected to a same second scanning line; and wherein the driving method comprises:

controlling a voltage value of the first reset signal to be Vref1, and controlling a voltage value of the second reset signal to be Vref2; and the amplitude modulation circuit comprises an amplitude data write sub-module configured to transmit a first data signal to the amplitude driving sub-module;

the pulse width modulation circuit comprises a pulse width data write sub-module configured to transmit a second data signal to the pulse width driving sub-module; and the driving method further comprises:

controlling a voltage value of the first data signal to be Vdata1, and controlling a voltage value of the second data signal to be Vdata2;

and wherein Vdata1<Vdata2, Vref1<Vref2.

14. A display panel, comprising pixel circuits and light-emitting elements, wherein a pixel circuit among the pixel circuits comprises an amplitude modulation circuit and a pulse width modulation circuit;

the amplitude modulation circuit comprises an amplitude driving sub-module and an amplitude reset sub-module, wherein the amplitude reset sub-module is configured to transmit a first reset signal to a control terminal of the amplitude driving sub-module;

the pulse width modulation circuit comprises a pulse width driving sub-module and a pulse width reset sub-module, wherein the pulse width reset sub-module is configured to transmit a second reset signal to a control terminal of the pulse width driving sub-module; and a voltage value of the first reset signal is Vref1, and a voltage value of the second reset signal is Vref2, wherein Vref1≠Vref2; and wherein operating modes of the display panel comprise a first mode and a second mode, wherein brightness of the display panel in the first mode is different from brightness of the display panel in the second mode;

in the first mode, the voltage value of the first reset signal is Vref15, and the voltage value of the second reset signal is Vref25; and in the second mode, the voltage value of the first reset signal is Vref16, and the voltage value of the second reset signal is Vref26;

wherein $|Vref15-Vref25|+|Vref16-Vref26|$.

15. The display panel of claim 14, wherein the brightness of the display panel in the first mode is less than the brightness of the display panel in the second mode, wherein $$|Vref15-Vref25|<|Vref16-Vref26|.$$

16. The display panel of claim 14, wherein Vref1<Vref2.

17. The display panel of claim 14, wherein Vref1>Vref2.

18. The display panel of claim 14, wherein the amplitude modulation circuit comprises an amplitude data write sub-module configured to transmit a first data signal to the amplitude driving sub-module;

the pulse width modulation circuit comprises a pulse width data write sub-module configured to transmit a second data signal to the pulse width driving sub-module; and a voltage value of the first data signal is Vdata1, and a voltage value of the second data signal is Vdata2, wherein Vdata1≠Vdata2.

19. The display panel of claim 18, wherein Vdata1<Vdata2.

20. The display panel of claim 18, wherein Vdata1>Vdata2.

* * * * *